US010797746B2

(12) United States Patent
Rieger

(10) Patent No.: US 10,797,746 B2
(45) Date of Patent: Oct. 6, 2020

(54) CODED ANTENNA ARRAY

(71) Applicant: Ossia Inc., Bellevue, WA (US)

(72) Inventor: Joel Rieger, Kirkland, WA (US)

(73) Assignee: Ossia Inc., Bellevue, WA (US)

( * ) Notice: Subject to any disclaimer, the term of this patent is extended or adjusted under 35 U.S.C. 154(b) by 48 days.

(21) Appl. No.: 16/194,137

(22) Filed: Nov. 16, 2018

(65) Prior Publication Data

US 2020/0162122 A1    May 21, 2020

(51) Int. Cl.
| | |
|---|---|
| H04B 1/707 | (2011.01) |
| H04J 13/00 | (2011.01) |
| H01Q 21/29 | (2006.01) |
| H04J 11/00 | (2006.01) |
| H04B 7/06 | (2006.01) |

(Continued)

(52) U.S. Cl.
CPC ............ *H04B 1/707* (2013.01); *H01Q 21/29* (2013.01); *H04B 7/0613* (2013.01); *H04J 11/003* (2013.01); *H04J 13/0048* (2013.01); *H04L 1/0668* (2013.01); *H04L 27/389* (2013.01)

(58) Field of Classification Search
CPC ...... H01Q 21/061; H01Q 21/24; H01Q 21/28; H01Q 21/29; H01Q 21/293; H01Q 21/296; H01Q 21/30; H04B 1/707; H04B 1/7103; H04B 1/711; H04B 7/0613; H04B 7/08; H04B 7/0842; H04B 7/0891; H04J 11/003; H04J 11/0036; H04J 13/0022; H04J 13/004; H04J 13/0048; H04L 1/06; H04L 1/0618; H04L 1/0625; H04L 1/0631; H04L 1/0668; H04L 7/08; H04L 7/0891;

(Continued)

(56) References Cited

U.S. PATENT DOCUMENTS

| | | | | |
|---|---|---|---|---|
| 6,072,770 A | * | 6/2000 | Ho ........................ | H04B 7/216 370/209 |
| 6,333,947 B1 | * | 12/2001 | van Heeswyk ...... | H04B 1/7107 375/148 |

(Continued)

OTHER PUBLICATIONS

PCT International Search Report, PCT/US19/60827, dated Feb. 25, 2020.

*Primary Examiner* — Young T Tse
(74) *Attorney, Agent, or Firm* — Law Office of R. Alan Burnett, P.S

(57) ABSTRACT

Coded antenna arrays and associated methods, apparatus and systems are disclosed. Signals transmitted by a client device are received at a plurality of antennas or antenna elements in an antenna array. The received signals are coded using codes such as orthogonal codes and pseudorandom number sequences under which the codes are selected to enable extraction of individual received signals. The coded signals are then combined to form a combined coded waveform that is processed using shared receiver circuitry. The shared receiver circuitry is configured to extract the signals received at each antenna using the codes used to code the received signals. Use of multiple client devices is also supported, with the receiver circuitry further configured to filter out signals received from individual client systems and calculate the phase and magnitude of the signals as received at each antenna. The signal phase and magnitude may be used for wireless transmission of power to clients by a wireless power transmission system.

21 Claims, 21 Drawing Sheets

(51) Int. Cl.
*H04L 1/06* (2006.01)
*H04L 27/38* (2006.01)

(58) Field of Classification Search
CPC ..... H04L 27/34; H04L 27/38; H04L 27/3809; H04L 27/389
USPC ....... 375/141, 142, 144, 148, 150, 260, 261, 375/267; 370/208–210, 355, 342
See application file for complete search history.

(56) References Cited

U.S. PATENT DOCUMENTS

| | | |
|---|---|---|
| 8,121,020 B1 * | 2/2012 | von der Embse ........ H04J 9/00 370/206 |
| 2003/0147655 A1 * | 8/2003 | Shattil .................... H04L 27/00 398/182 |
| 2003/0216156 A1 | 11/2003 | Chun |
| 2008/0291083 A1 * | 11/2008 | Chang ................. H01Q 3/2605 342/354 |
| 2015/0160335 A1 | 6/2015 | Lynch et al. |
| 2018/0083816 A1 | 3/2018 | Bolstad et al. |
| 2018/0128892 A1 | 5/2018 | Granato |

\* cited by examiner $$\begin{bmatrix}
1 & 1 & 1 & 1 & 1 & 1 & 1 & 1 \\
1 & -1 & 1 & -1 & 1 & -1 & 1 & -1 \\
1 & 1 & -1 & -1 & 1 & 1 & -1 & -1 \\
1 & -1 & -1 & 1 & 1 & -1 & -1 & 1 \\
1 & 1 & 1 & 1 & -1 & -1 & -1 & -1 \\
1 & -1 & 1 & -1 & -1 & 1 & -1 & 1 \\
1 & 1 & -1 & -1 & -1 & -1 & 1 & 1 \\
1 & -1 & -1 & 1 & -1 & 1 & 1 & -1
\end{bmatrix}$$

*Fig. 3a* (prior art)

$$\begin{bmatrix}
-1 & -1 & -1 & -1 & -1 & -1 & 1 & 1 \\
-1 & 1 & -1 & -1 & 1 & 1 & -1 & -1 \\
-1 & 1 & 1 & 1 & -1 & -1 & -1 & -1 \\
-1 & -1 & 1 & 1 & 1 & 1 & 1 & 1 \\
-1 & 1 & -1 & 1 & -1 & 1 & 1 & -1 \\
-1 & 1 & -1 & 1 & 1 & -1 & -1 & 1 \\
-1 & 1 & 1 & -1 & -1 & 1 & -1 & 1 \\
-1 & 1 & 1 & -1 & 1 & -1 & 1 & -1
\end{bmatrix}$$

*Fig. 3b* (prior art)

CODED ANTENNA ARRAY

FIELD OF THE INVENTION

The field of invention relates generally to wireless communication and, more specifically but not exclusively relates to coded antenna arrays and associated circuitry.

BACKGROUND INFORMATION

Use of wireless communication is ubiquitous in today's environment. From mobile phones to tablets to wireless-connected computers to Internet of Things (IoT) devices, it would be hard to imagine going back to a wired world. With each new generation of mobile telecommunication technology (e.g., 3G, 4G, and soon 5G), the available bandwidth has increased dramatically. Similar gains have been made using other wireless technologies, such as IEEE 802.11, aka, Wi-Fi, which is widely used by mobile phones, tablets, laptops, notebooks, and other types of computing devices. Other wireless technologies include Bluetooth, WiMAX, Satellite, and ZigBee.

A fundamental aspect of wireless communications is antennas and associated signal processing circuitry. The antennas are used to transmit and receive analog radio signals (which are received as incident radio waves) using various modulation schemes. These schemes include but are not limited to Time-Division Multiple Access (TDMA), Code-Division Multiple Access (CDMA), Direct-Sequence Spread Spectrum (DSSS) Frequency-Hopping Spread Spectrum (FHSS) and Orthogonal Frequency-Division Multiple Access (OFDMA). Variations and/or combinations of these technologies may also be implemented, such as DS-CDMA (Direct-Sequence Code Division Multiple Access). Separate transmitter and receiver circuitry, commonly referred to as a transmitter and receiver, is used to generate the transmitted signals and process the received signals. It is also common to integrate the circuitry for implementing the transmitter and receiver functions in a single component called a transceiver.

Antenna technologies have also experienced advancements in recent years. For example, so-called "smart" antennas are antenna arrays with intelligent signal processing used to identify spatial signal information such as direction of arrival and used to calculate beamforming vectors to track and locate the antenna beam of a target devices.

The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 3a and 3b show exemplary sets of 8-bit Walsh codes;

DETAILED DESCRIPTION

Figure 1:
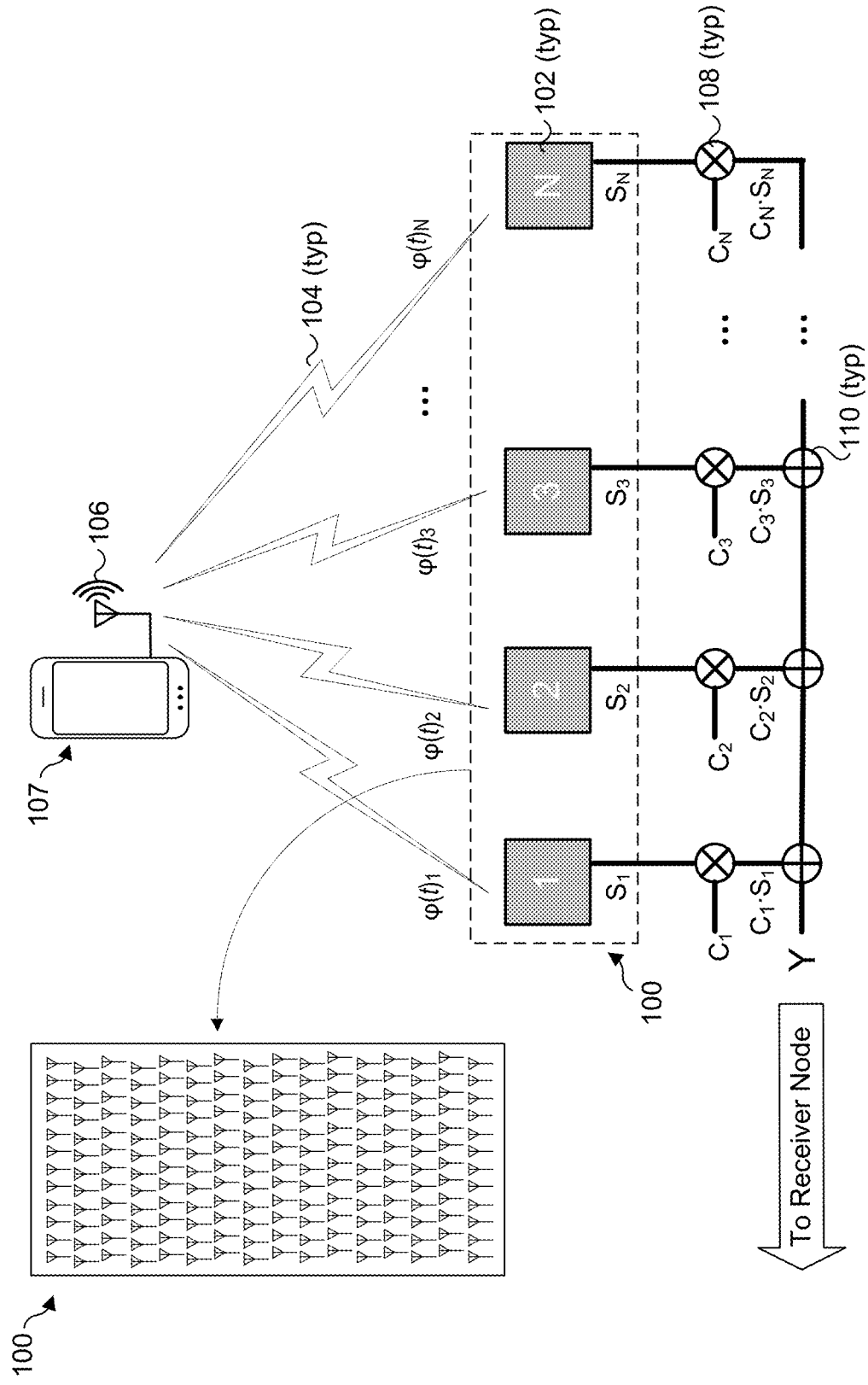
FIG. 1 is a diagram illustrating processing of signals received by an antenna array in a manner that produces a coded combined waveform Y, according to one embodiment.

Embodiments of coded antenna arrays and associated methods, apparatus and systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. For example, the terms signals and waveforms are used interchangeably herein. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Code Antenna Array

In accordance with aspects of the embodiments disclosed herein, novel schemes are presented that enable multiple antennas to share receiver circuitry and signal processing operations performed by a receiver, in such a way that signal-processing can mathematically compute individual signals received at each antenna. Sharing receiver circuitry provides several advantages over current techniques, which require separate receivers for each antenna. The advantages include cost savings and simplifying timing synchronization difficulties. The cost and simplification advantages also scale with the number of antennas that share the receiver circuitry.

Under aspects of a method performed by a coded antenna array, signals transmitted by a client device or the like are received at a plurality of antennas or antenna elements in an antenna array. In some embodiments signals are coded using orthogonal codes under which the orthogonal code used to code a given received signal is orthogonal to each of the orthogonal codes used to code the other received signals. In other embodiments, the signals are coded using pseudorandom number (PN) sequences. The coded signals are then combined to form a combined coded waveform that is processed using shared receiver circuitry, as described in further detail below.

FIG. 1 illustrates aspects of processing signals received by an antenna array in a manner that produces a coded combined waveform Y, according to one embodiment. As shown, antennas in an antenna array 100 including N antennas 102 receive radio signals 104 transmitted from an antenna 106 of a client device 107. As the radio signals 104 have spatial diversity, each antenna 102 receives a respective signal S that may have different phase (in time) than the radio signal received at the other antennas in antenna array 100, as depicted by $\varphi(t)_1, \varphi(t)_2, \varphi(t)_3, \ldots \varphi(t)_N$. The signals received at antennas 1, 2, 3, and N are respectively depicted as signals $S_1, S_2, S_3$, and $S_N$.

Under the illustrated embodiment, the signal received at each antenna, $S_1, S_2, S_3, \ldots S_N$, is coded with respective codes, $C_1, C_2, C_3, \ldots C_N$, at mixers 108 to form coded signals $C_1 S_1, C_2 S_2, C_3 S_3, \ldots C_N S_N$. The coded signals are then added together or otherwise combined to form the combined coded waveform Y, as depicted by adders 110. As explained in further detail below, when codes $C_1, C_2, C_3, \ldots C_N$ are orthogonal codes, each signal $S_1, S_2, S_3, \ldots, S_N$, can be extracted from the combined waveform, Y such that the extracted signal matches the original signal.

In one embodiment, in order for this scheme to work optimally, $C_1, C_2, C_3, \ldots, C_N$ are chosen such that the dot product of $C_N$ and $C_M$ is 0 for $N \neq M$ and is 1 when $N=M$, as shown in equation set 1:

$C_N \cdot C_N = \text{len}(C_N)$
$C_N \cdot C_m = 0$ for $N \neq M$ (1)

This is to say that any two codes with dissimilar indices (i.e., M≠N) will be orthogonal. One such set of codes with this property is called Walsh or Hadamard Codes. (In radio communication, Walsh codes are sometimes called Hadamard code and vice versa—there is some disagreement to which of Walsh and Hadamard is the actual originator of the coding scheme.) Using this property, all signals can be combined into one signal path, Y:

$$Y = C_1 \cdot S_1 + C_2 \cdot S_2 + C_3 \cdot S_3 + \ldots + C_N \cdot S_N \quad (2)$$

$S_1, S_2, S_3, \ldots, S_N$ can be extracted from the combined waveform, Y, by the scaler product with the corresponding code, $$S_1 = C_1 \cdot Y = C_1 \cdot (C_1 \cdot S_1 + C_2 \cdot S_2 + C_3 \cdot S_3 + \ldots + C_N \cdot S_N) = \quad (3)$$
$$(C_1 \cdot C_1 \cdot S_1 + C_1 \cdot C_2 \cdot S_2 + C_1 \cdot C_3 \cdot S_3 + \ldots + C_1 \cdot C_N \cdot S_N) =$$
$$(\alpha \cdot 1 \cdot S_1 + 0 \cdot S_2 + 0 \cdot S_3 + \ldots + 0 \cdot S_N) = \alpha \cdot S_1$$

The foregoing can be represented by the following equations, $$S_n = \sum_0^{len(cn)} Y[i] * c_n[i] \quad (4)$$

or more concisely, $$S_n = Y \cdot C_n \quad (5)$$

where n is the signal and code indices and $S_n$ is the dot product of Y and $C_n$.

With reference to system 200 of FIG. 2, in one embodiment the foregoing approach is implemented in the following manner. Under system 200, a plurality of client devices (also referred to herein as clients) j, k, . . . y transmit signals Sj, Sk, and Sy from respective antennas 202, 204, and 206, which are received by antennas 1, 2, 3, . . . . N in antenna array 100. Each client j, k, . . . y includes similar signal processing and transmitter circuitry; however, a separate frequency, timeslot or code is assigned to each client, which is used to transmit that client's signals Sj, Sk, and Sy such that each client signal can be filtered out from the other client signals, as described below.

The waveforms of the signals received from each of clients j, k, . . . y at each of antennas 1, 2, 3, . . . . N are superimposed on one another to form incident signals $S_1, S_2, S_3, \ldots, S_N$. Each incident signal S includes a superimposed combination of signal waveforms received from each of clients j, k, . . . y, as depicted by $S_1 = S_{j1} + S_{k1} \ldots + S_{y1}$ for incident signal $S_1$. As mentions above, for transmission from a given client, the signal received at different antennas may differ slightly in phase and/or magnitude, depending on the physical layout of the antennas in the antenna array and signal propagation considerations. Accordingly, references in the drawing figures to the signals that are received at antennas 1, 2, 3, . . . . N from a given client device have an appended antenna number in addition to an indices of the client, such as signals $S_{k1}, S_{k2}, S_{k3}, \ldots, S_{kN}$ for client k.

In a manner similar to that described above for FIG. 1, each incident signal $S_1, S_2, S_3, \ldots, S_N$ is coded with a respective code $C_1, C_2, C_3, \ldots, C_N$ at mixers 108, with the coded signals $C_1 S_1, C_2 S_2, C_3 S_3, \ldots, C_N S_N$ being combined via adders 110 into a combined coded waveform Y. The coding of the signals results in multiplying the radio frequency (RF) waveform for the incident signal by 1 or −1 (i.e., 0 or 180 degree phase shift) based on the bit sequence for each code $C_1, C_2, C_3, \ldots, C_N$. The use of codes comprising orthogonal or PN sequences allow the incident signal received at a given antenna to be combined with incident signals received at the other antennas in the antenna array while minimizing interference.

Orthogonal codes and PN sequences also enable the incidence signals $S_1, S_2, S_3, \ldots, S_N$ to be extracted from the combined coded waveform Y via operations performed by a receiver node 208. Combined coded waveform Y is provided as an input to receiver node 208, where it is down-converted to an intermediate signal at a down-conversion block 210, and then processed at an IQ demodulator 212 to reconstruct the in-phase component I(t) and the quadrature component Q(t) of the intermediate signal, thereby generating a baseband signal comprising a complex representation of the combined coded waveform Y. Circuitry and/or embedded logic in receiver node 208 can then multiply the complex representation by each antenna's code $C_1, C_2, C_3, \ldots, C_N$ to extract the incident signals $S_1, S_2, S_3, \ldots, S_N$. This is depicted by multiplying the complex representation output by IQ demodulator 212 with a code $C_m$, as depicted by a $C_m$ block 214 and a mixer 216. In this example, a signal $S_m$ depicted by a block $218_m$ corresponds to the antenna that used a code $C_m$ to code the incident signal received at that antenna. In a similar manner, other codes $C_1, C_2, C_3, \ldots, C_N$ may be used to extract signals $S_1, S_2, S_3, \ldots, S_N$.

As further depicted in receiver node 208, once the incident signals $S_1, S_2, S_3, \ldots, S_N$ are extracted, the extracted signals are passed through or otherwise processed by an applicable set of filters to separate out the individual signals received at a given antenna from each client. In the example illustrated in FIG. 2, a client filter 'k' is used to separate out the IQ signal components of respective incident signals $S_1, S_2, S_3, \ldots, S_N$ received at antennas 1, 2, 3, . . . . N from client k. These filtered signals are labeled $S_{k1}, S_{k2}, S_{k3},$ and $S_{kN}$.

Generally, the type of filters to be used may be based on the scheme used to uniquely identify the individual signals transmitted by the clients in a given system. For example, in one embodiment a different frequency or tone is used by each client, and corresponding frequency bandpass filters may be used to filter out the signals for each client. Under another scheme, clients are assigned separate time-slots during which they transmit a beacon signal or the like. Other schemes may be used, such as encoding each client's transmissions with a unique code, with corresponding filters used to separate out signals transmitted by different clients based on the code used by each client. Other techniques known in the art may likewise be used.

Once the client signals are separated, signals $S_{k1}, S_{k2}, S_{k3},$ and $S_{kN}$ can then be further processed to determine the magnitude and the phase of the signals (as received at each of antennas 1, 2, 3, . . . . N from that client). In order to extract the amplitude and phase, the in-phase component I(t) and the quadrature component Q(t) of the baseband signal at a given point in time may be used, as follows:

$$S_n = I_n + jQ_n \quad (6)$$

The magnitude can be calculated as, $$|S_n| = \sqrt{I_n^2 + Q_n^2} \quad (7)$$

The phase can be calculated as, $$\varphi_n = \tan^{-1}\left(\frac{Q_n}{I_n}\right) \quad (8)$$

As described above, incident signals comprising radio waves arrive at each antenna, where they are coded with a unique code composed of a sequence of bits. The bit sequences are similar to a binary bit sequence, except it is conventional practice to replace binary '0' with '−1' such that the bit sequence is composed of 1's and −1's. The coding results in multiplying the radio frequency (RF) waveform by 1 or −1 (i.e., 0 or 180 degree phase shift). The use of appropriate codes, such as orthogonal codes and PN sequences, allows the incident signal to be combined with incident signals received at other antenna elements while minimizing interference. As discussed above, in one embodiment the codes are orthogonal codes. An example of an orthogonal code that may be used are Walsh codes (aka Hadamard codes). Walsh and Hadamard codes can be generated using well-known techniques, such as a Haramard generator matrix.

The length of the orthogonal code will typically be a function of the number of unique orthogonal codes to be implemented. Under various embodiment, the number N of antennas or antenna elements may range from 10's to 100's, noting that configurations where N is less than 10 may also be implemented. In some embodiments, N is 64 or greater. Examples of sets of 8-bit Walsh code that could be implemented with a scheme where N=8 are shown in FIGS. 3a and 3b. Longer Walsh codes may be generated and used in a similar manner, where the length (len) of the code is N.

Figure 2:
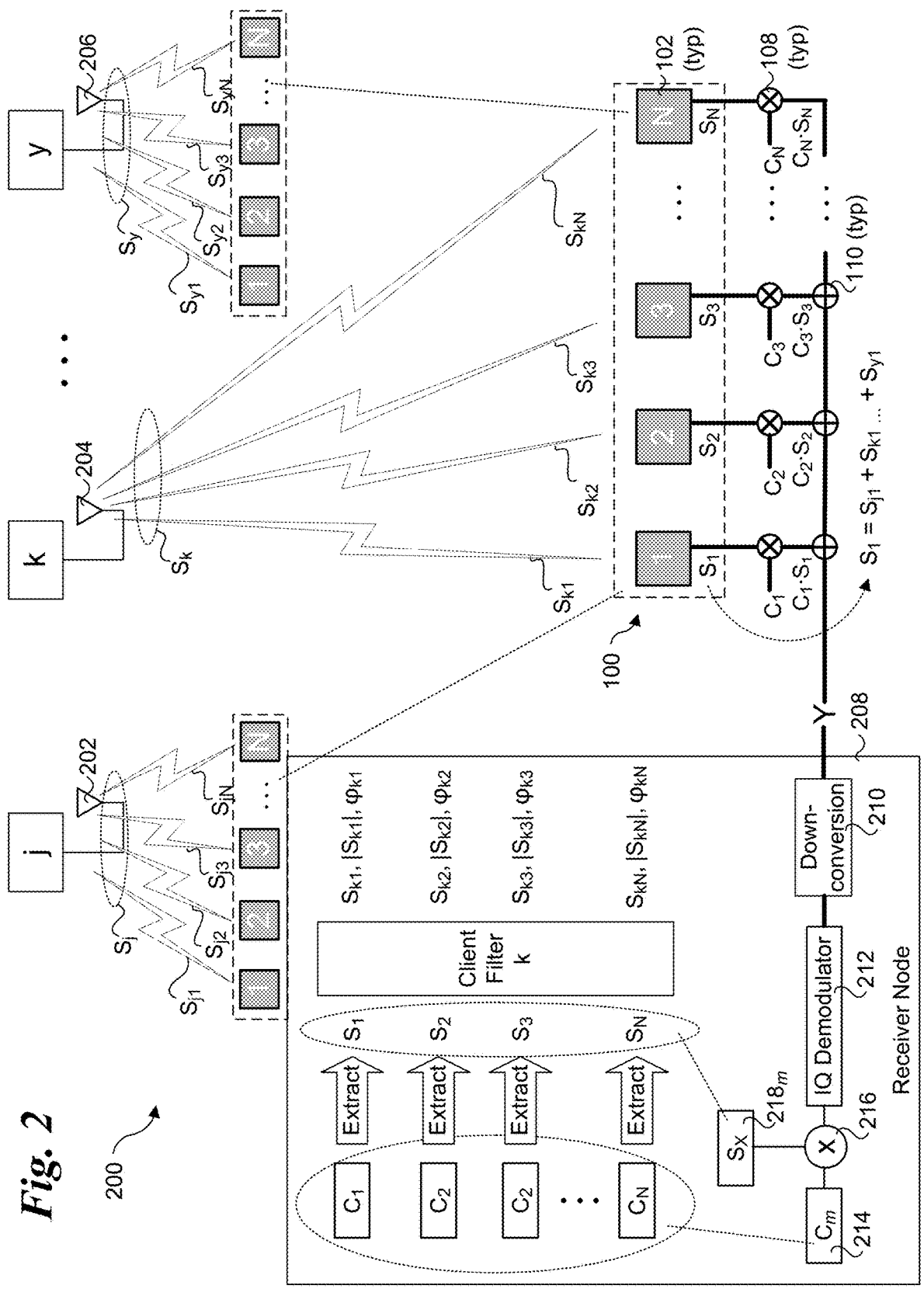
FIG. 2 is a system diagram illustrating how signals received from multiple clients are coded and processed in a manner then enables the signals received at individual antennas and from each client to be extracted, according to one embodiment.

FIGS. 4a-4c, 5, and 6 illustrate a simplified example of how incident signals are processed using the various stages of the process illustrated in FIG. 2. The process begins with FIG. 4a, which shows a graph 400a illustrating four incident waveforms received at four respective antennas. As shown in the lower portion of the diagram, the incident waveforms are also referred to incident signals $S_1$, $S_2$, $S_3$, and $S_4$.

Figure 4A:
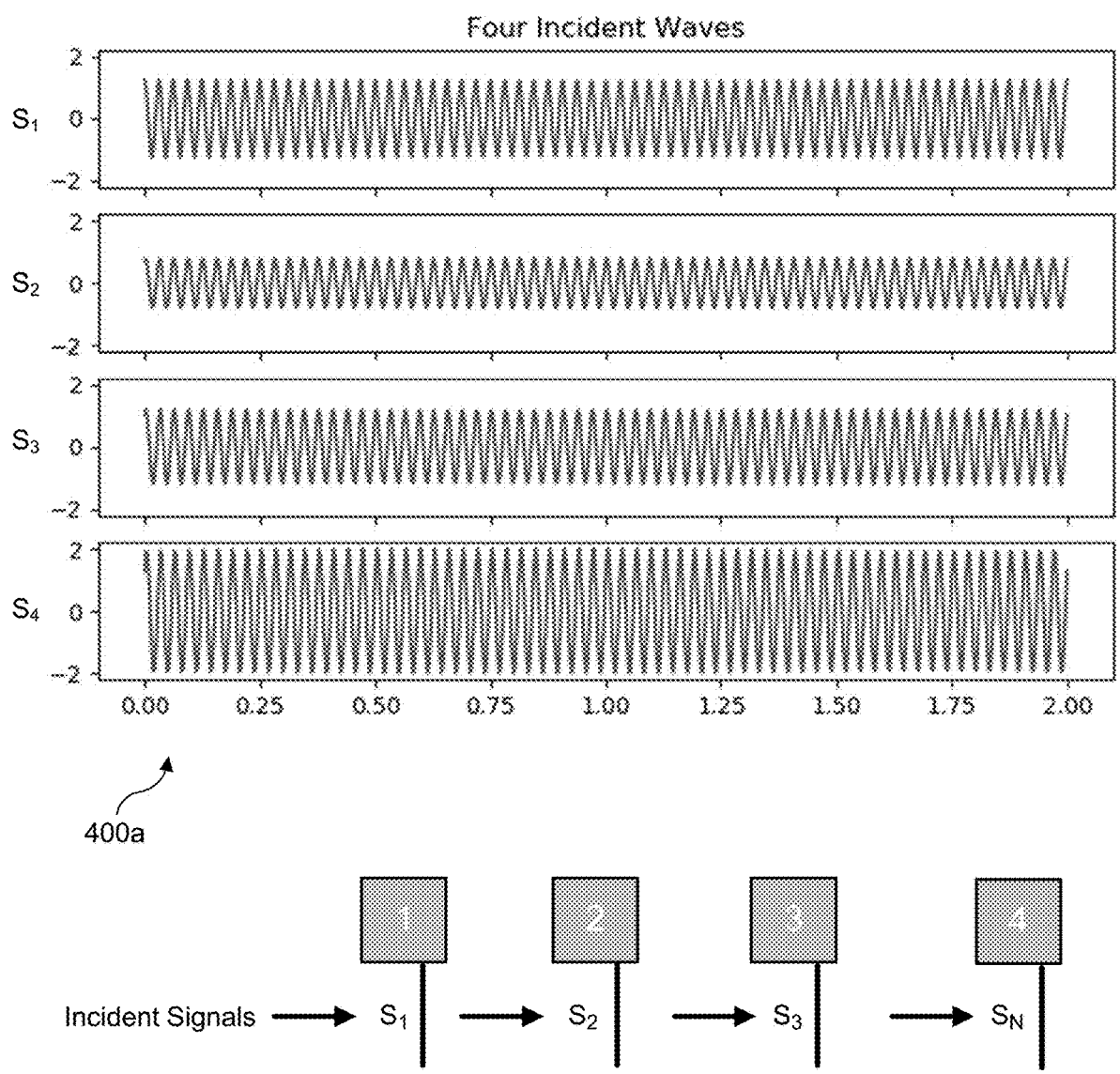
FIG. 4a shows a graph illustrating four incident waveforms received a four respective antennas.
Figure 4B:
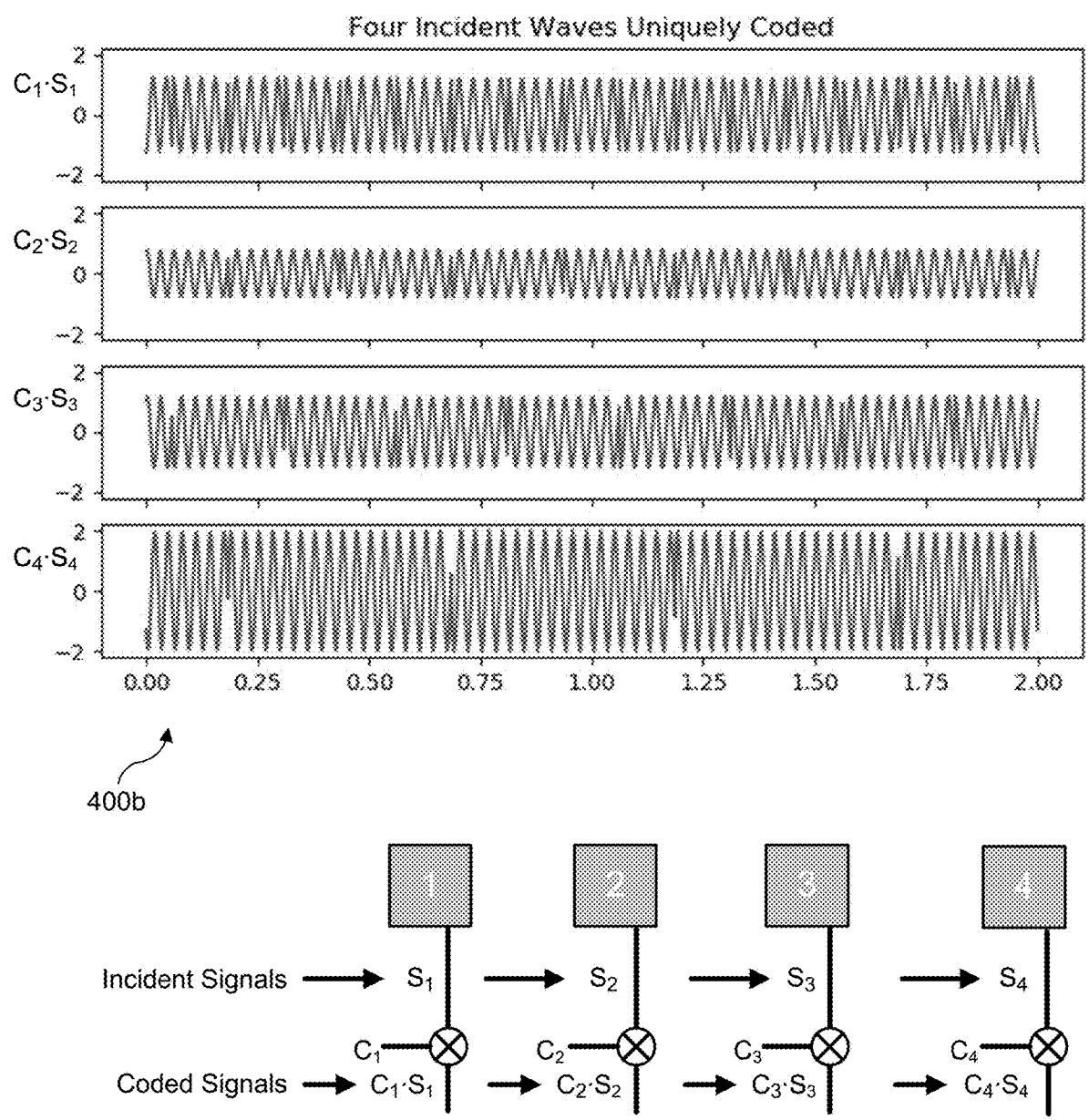
FIG. 4b shows a graph illustrating the four incident waveforms of FIG. 4a after they have been coded.

FIG. 4b shows the four coded waveforms obtained by coding the four incident signals $S_1$, $S_2$, $S_3$, and $S_4$ with respective codes $C_1$, $C_2$, $C_3$, and $C_4$, resulting in coded signals $C_1 S_1$, $C_2 S_2$, $C_3 S_3$, and $C_4 S_4$.

Figure 4C:
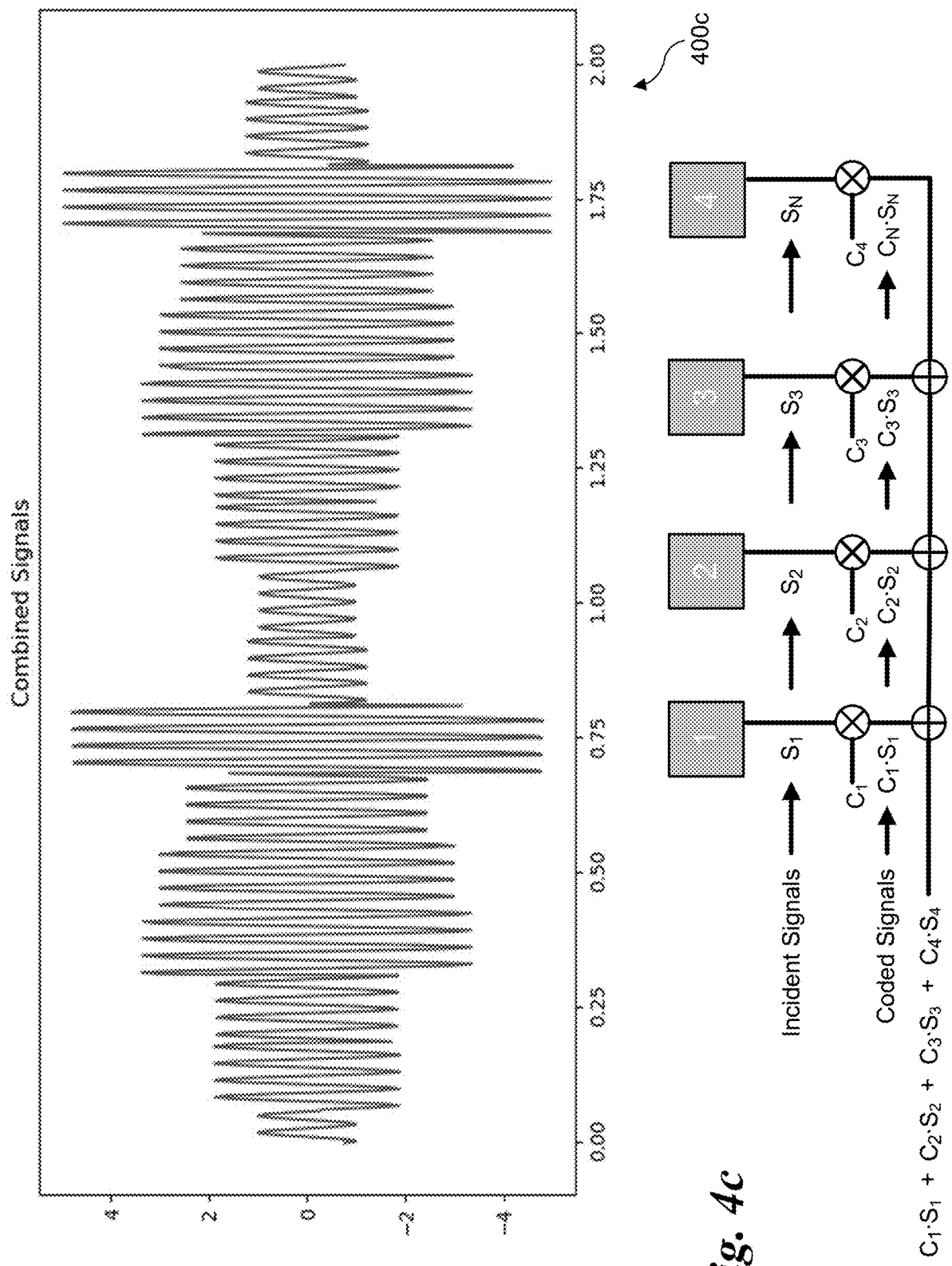
FIG. 4c shows a graph illustrating a combined waveform produced by adding the four coded waveforms of FIG. 4b.

In the manner described above, the coded signals can be combined and share a common signal path, enabling a single set of receiver/signal processing hardware to process signals received from multiple antennas or multiple antenna elements. This is illustrated in FIG. 4c, where coded signals $C_1 S_1$, $C_2 S_2$, $C_3 S_3$, and $C_4 S_4$ are added to form coded combined waveform Y.

After the coded signals are combined, in some embodiments the combined waveform is down-converted to an intermediate signal. For other embodiments, down-conversion to an intermediate signal may not be used. Generally, the combined waveform may be down-converted using techniques and signal-processing circuitry that is well-known in the art, such as a mixer.

Figure 5A:
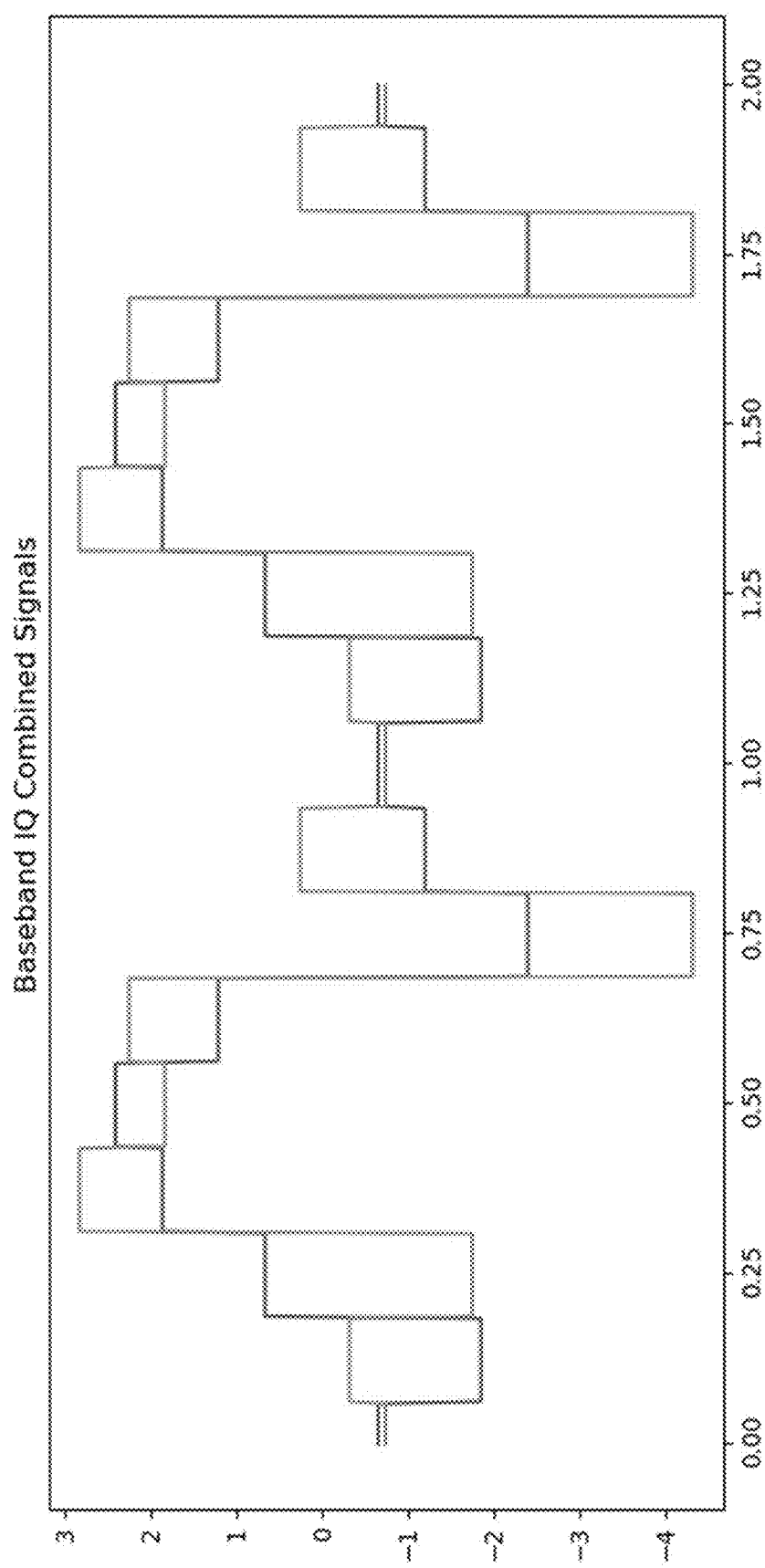
FIGS. 5a and 5b show graphs illustrating baseband IQ combined signals produced by IQ demodulation of the combined waveform, where I and Q components are shown in a single graph in FIG. 5a and in separate graphs in FIG. 5b.
Figure 5B:
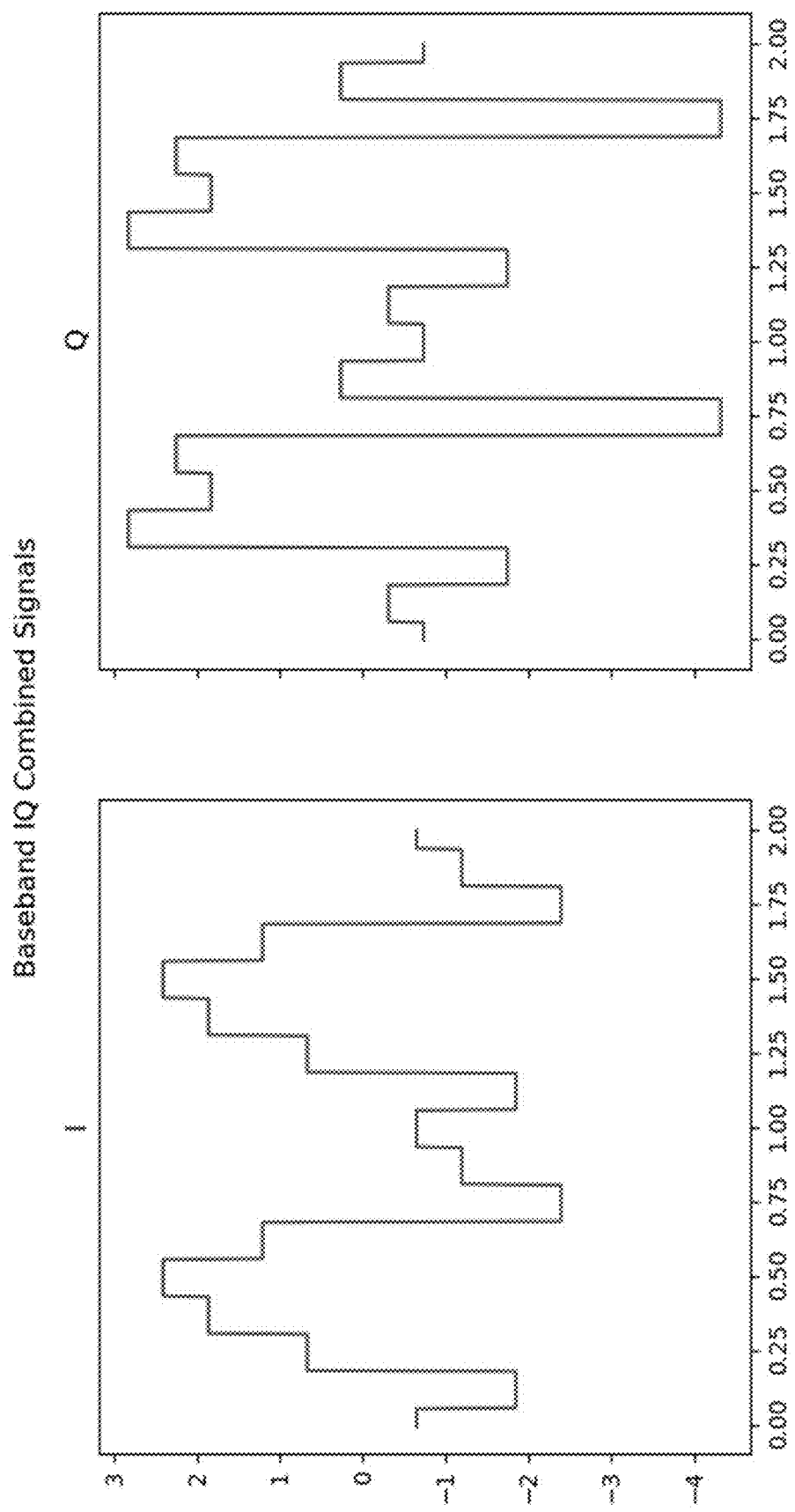

Next, the intermediate signal form of the combined coded waveform (or the combined coded waveform itself if down-conversion is not performed) is processed using an IQ demodulator to generate a complex representation of the combined waveform including the in-phase and quadrature components I(t) and Q(t). Examples of the complex representation are shown in FIGS. 5a and 5b.

Using embedded logic and/or embedded software, the individual signals received at each antenna can be extracted. By using orthogonal codes (e.g., Walsh Codes), incident signals for each antenna can be extracted such that the incident signals and the exacted signals are the same (absent potential imperfections in the incident signals). Codes comprising PN sequences may also be used, such as "Gold" codes used by CDMA mobile radio systems.

Figure 6:
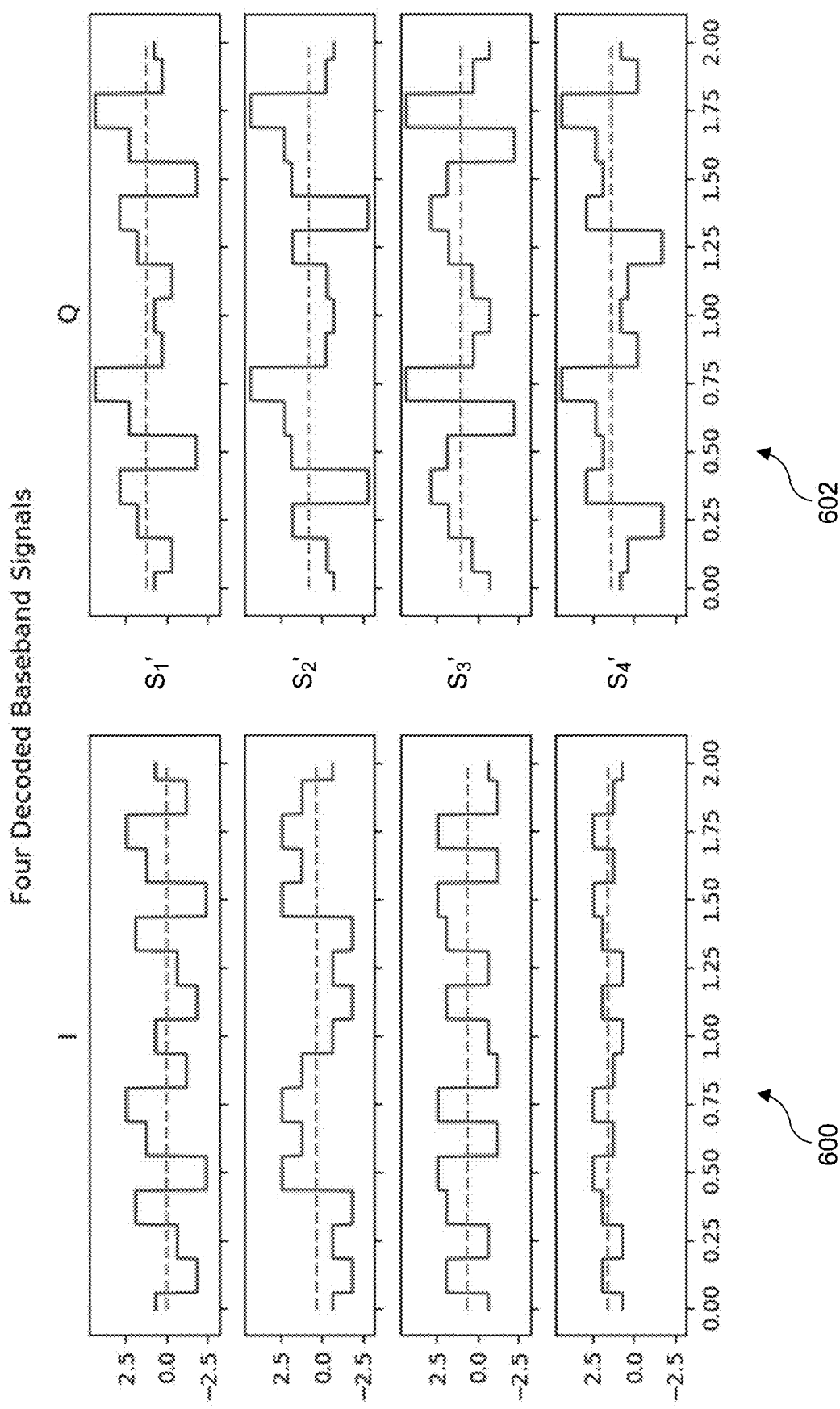
FIG. 6 is a graph illustrating the I and Q components of the four decoded baseband signal resulting by applying the codes in FIG. 4b to the baseband IQ combined signals of FIG. 5.

As described above, the incident signals for individual antennas are extracted by applying the same codes using to code the incident signals to the complex representation output by the IQ demodulator. As shown in FIG. 6, this results in extracting four decoded baseband signals $S_1'$, $S_2'$, $S_3'$, and $S_4'$ having the same I and Q components as respective incident signals $S_1$, $S_2$, $S_3$, and $S_4$.

As described above, the phase of the signals received from each client at each antenna can also be extracted. For example, in one embodiment the phase of antenna element k is extracted using an FFT as follows.

$$X_0 = FFT\{C_k * \text{Downconverted Waveform}\}|_{f=0}$$

$$\text{Phase}(k) = ang \tan 2(\text{real}(X_0), imag(X_0)) \quad (9)$$

where * denotes the dot product. In FIG. 6, the dashed lines in the 'I' graph 600 depict the average phase over the length of the code.

The magnitude of the extracted signals can also be calculated, such as by using equation 7 above. The average magnitude of the decoded baseband signals $S_1'$, $S_2'$, $S_3'$, and $S_4'$ is illustrated by the dashed lines in the 'Q' graph 602.

Figure 7:
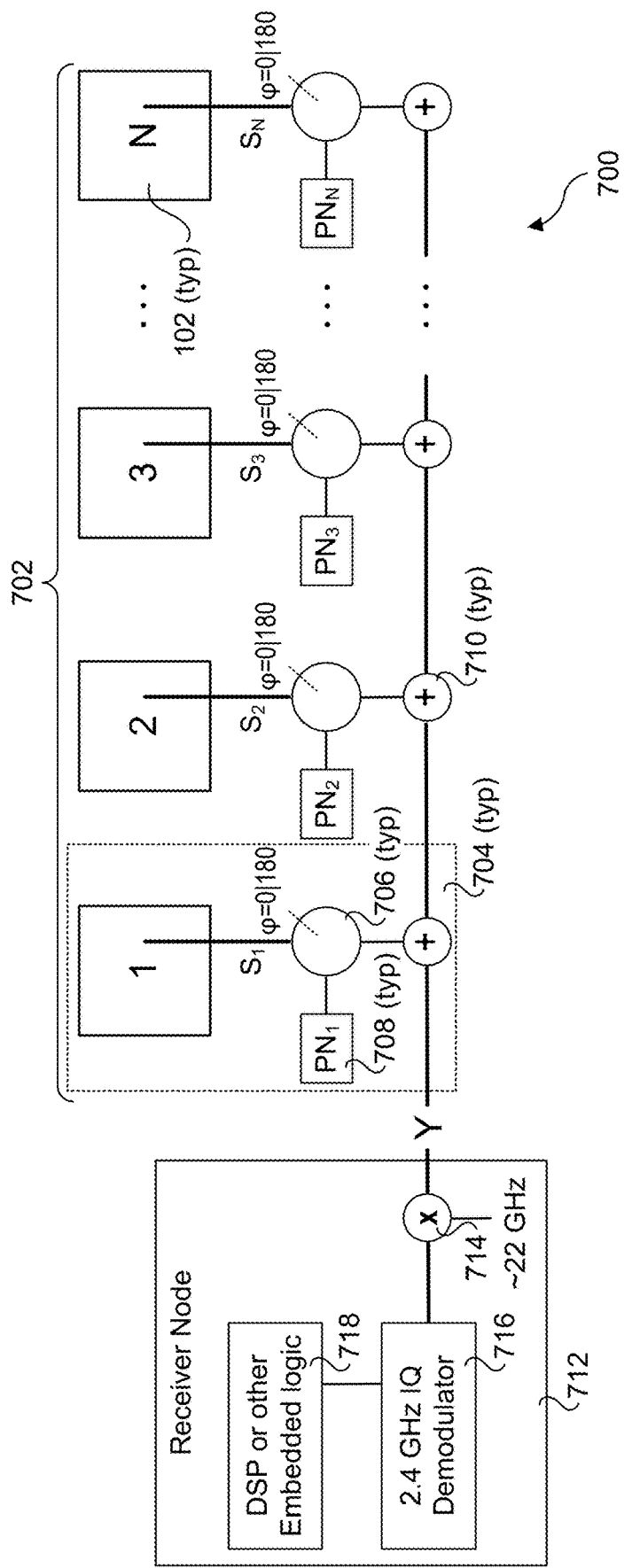
FIG. 7 shows a block diagram for an exemplary 24 GHz system implementation, according to one embodiment.

FIG. 7 shows a block diagram 700 for an exemplary 24 GHz system implementation, according to one embodiment. As before, antenna array 100 includes N antennas (or antenna elements) 102, each receiving a respective incident signal S (i.e., $S_1$, $S_2$, $S_3$ . . . . $S_N$). A block of circuitry for coding the incidence signals is associated with each antenna (or antenna element) 102. As used herein, an antenna or antenna element and its associated block of circuitry is called an "antenna/circuit block." As shown in FIG. 7, the embodiment includes and array 702 of N antenna/circuit blocks 704.

Each antenna/circuit block 704 includes an antenna 102, a one-bit phase-shifter 706, and a PN code block 708. As depicted, antenna/circuit block 704 further includes an adder 710. As an option, the adders 710 shown in FIG. 7 may be considered as circuitry that is separate from antenna/circuit blocks 704.

In the illustrated embodiment, each incident signal is coded with a code having a unique PN sequence 702 ($PN_1$, $PN_2$, $PN_3$, $PN_N$). The PN sequences are implemented by ON code blocks 708, with each PN code block labeled with $PN_n$, where the subscript 'n' corresponds to the antenna/circuit block's associated antenna. The one-bit phase-shifter 704 is used to shift the phase either 0 or 180 degrees in response to bit values in the PN sequence depending on whether the current bit in the PN sequence is a 1 or a −1. In this manner, the one-bit phase-shifter can encode the incident signal to have a unique code and enable the incident signal for that particular antenna to be extracted from the combined coded waveform Y in the manner described above.

The coded signals output by each one-bit phase-shifter 704 is added via adders 710 to form a combined coded waveform Y. The combined coded waveform Y is then processed by a receiver node 712. At a mixer 714, the combined coded waveform Y is down-converted to an intermediate signal using a frequency of approximately 22 GHz. The down-converted signal is then fed into a 2.4 GHz IQ demodulator 716 to reconstruct the in-phase component I(t) and the quadrature component Q(t) of the intermediate signal, thereby generating a complex representation of the combined coded waveform. This complex representation of the combined coded waveform output by 2.4 GHz IQ demodulator 716 is processed using a digital signal processor (DSP) or other embedded logic in a block 718.

Generally, a DSP may be programmed or otherwise configured to perform digital signal processing operations to suite the particular transmission scheme used for the system using well-known principles. This includes the incident signal extraction functions described herein. A DSP may also be used to calculate signal phase and magnitude values. In addition to a DSP, other forms of embedded logic may be used, such as but not limited to programmed logic components such as an FPGA (Field Programmable Gate Array) or an ASIC (Application Specific Integrated Circuit). An embedded processor running embedded software or firmware may also be used to perform incident signal extraction operations and/or calculate signal phase and magnitude values. Various types of processor may be used for such an embedded processor, including general-purpose processors, processor engines, microcontrollers, etc. In some embodiments, signals are processed using FFTs.

In addition to the antenna elements/circuits shown in the previous figures, various other configurations may be used to implement similar functionality. For example, non-limiting examples of alternative antenna elements and associated circuitry are shown in FIGS. 8a-8f.

Figure 8A:
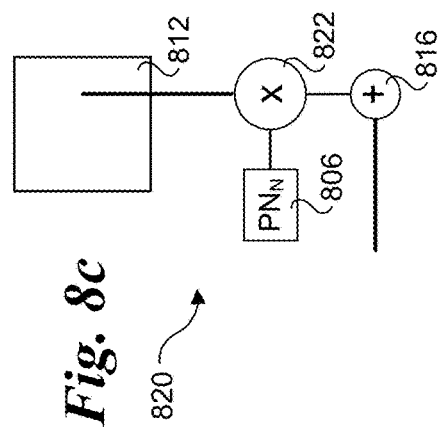
FIG. 8a is a block diagram of a phase-reconfigurable antenna 800, according to one embodiment.

FIG. 8a shows an embodiment of a phase-reconfigurable antenna 800. An antenna element 802 includes a PIN or Varactor diode (s) 804 that is configured to switch between a 0 and 180 degree phase shift. A pseudorandom code block 806 is used to code the incident signal received by antenna element 802 after it passing through PIN diode 804.

Figure 8B:
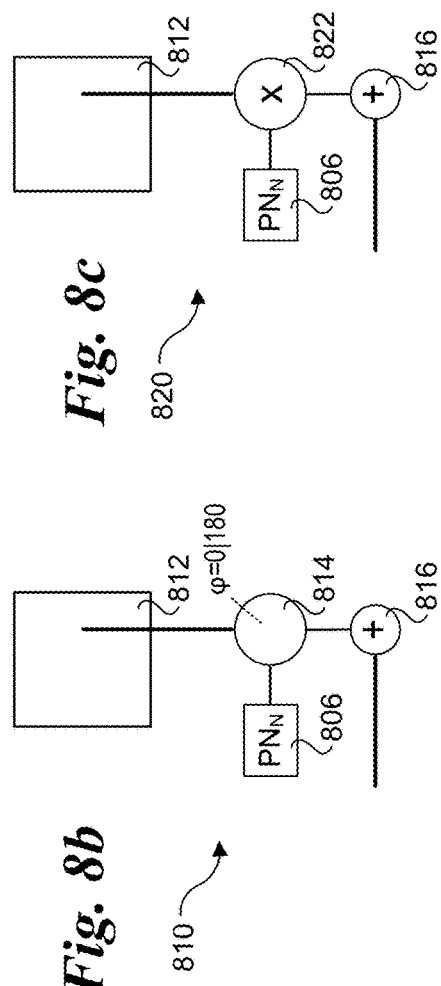
FIG. 8b is a block diagram of an antenna/circuit block including a one-bit phase-shifter or an N-bit phase-shifter, according to one embodiment.

FIG. 8b shows an embodiment of an antenna/circuit block 810 including a one-bit phase-shifter or an N-bit phase-shifter, which is similar to antenna/circuit block 704 of FIG. 7. This configuration includes an antenna element 812, a one-bit or N-bit phase shifter 814, and a pseudorandom code block 806. The operation of this embodiment is similar to that described above with reference to FIG. 7, with the additional option of using an N-bit phase-shifter in addition to the one-bit phase-shifter in FIG. 7. As shown by an adder 816, the coded and phase-shifted signal is added to other coded and phase-shifted signals (not shown), in a similar manner to that shown in FIG. 7 and discussed above.

Figure 8C:
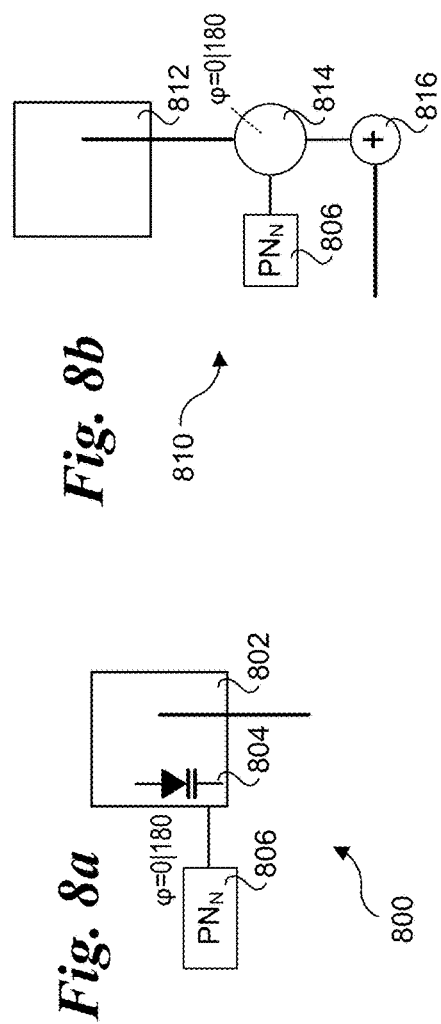
FIG. 8c is a block diagram illustrating an antenna/circuit block using a mixer or image-reject mixer, according to one embodiment.

FIG. 8c shows a block diagram illustrating an embodiment of an antenna/circuit block 820 using a mixer or image-reject mixer. Antenna/circuit block 820 includes an antenna element 812, a mixer 822, a pseudorandom code block 806 and an adder 816. An incident signal is received by antenna element 812 and coded with a pseudorandom code $PN_N$ at mixer 822. [Explain how the image-reject mixer works]

Figure 8F:
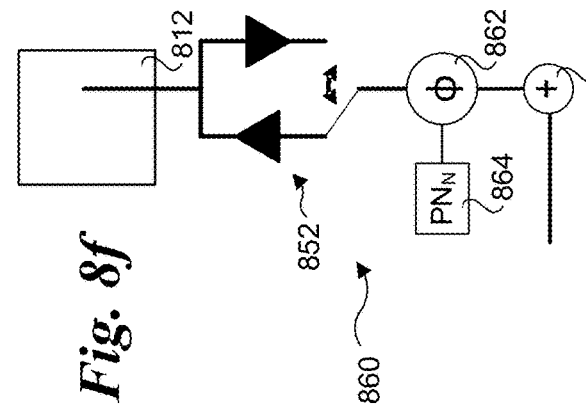
FIG. 8f is a block diagram illustrating an antenna/circuit block including a full RF front-end and phase shifter, according to one embodiment.
Figure 8E:
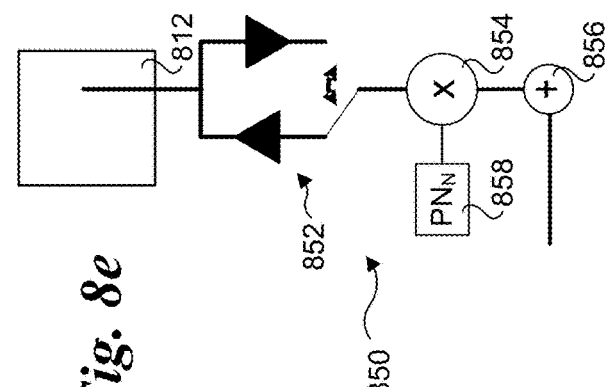
FIG. 8e is a block diagram illustrating an antenna/circuit bloc including a full RF front-end mixer, according to one embodiment.
Figure 8D:
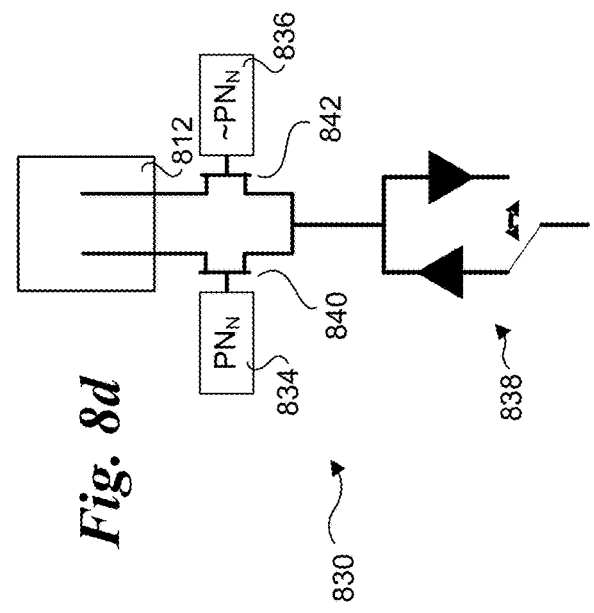
FIG. 8d is a block diagram of illustrating an antenna/circuit block that switches 180 degrees using a tap-point, according to one embodiment.

FIG. 8d shows a block diagram illustrating an embodiment of an antenna/circuit block 830 that switches 180 degrees using a tap-point. In the illustrated embodiment, there is one RF front-end per antenna. In further detail, antenna/circuit block 830 includes an antenna element 812, a pseudorandom number ($PN_N$) block 834, and inverse of the pseudorandom number ($\sim PN_N$) block 836, and a bi-directional switch 838. Each of $PN_N$ block 834 and $\sim PN_N$ block 836 is coupled to the incident signal S received by antenna element 832 via a respective tap 840 and 842. Under alternate configuration, there is on RF front-end per antenna (e.g., such as shown in FIG. 8d) or $2^N$ antennas per RF front-end.

FIG. 8e shows a block diagram illustrating an embodiment of an antenna/circuit block 850 including a full RF front-end and mixer. Antenna/circuit block 850 includes an antenna element 812 coupled to a bi-directional switch 852, a mixer 854, a $PN_N$ block 858, and an adder 856. Control circuitry (not shown) is used to control the direction of bi-directional switch 852. When operating as a receiver, an incident signal received at antenna element 812 follows the right-hand branch and is mixed with an orthogonal PNN code at mixer 854, with the output of mixer 854 added to other signals received at different antenna elements (not shown) at adder 856.

FIG. 8f shows a block diagram illustrating an embodiment of an antenna/circuit block 860 including a full RF front-end and phase shifter. Antenna/circuit block 860 includes an antenna element 812 coupled to a bi-directional switch 852, a phase-shifter 862, a $PN_N$ block 864, and an adder 866. As before, control circuitry (not shown) is used to control the direction of bi-directional switch 852. When operating as a receiver, an incident signal received at antenna element 812 follows the right-hand branch of bi-directional switch 852 and is phase-shifted at phase-shifter 862, which also receives an orthogonal PN code from $PN_N$ block 864. The output of phase-shifter 862 is added to other signals received at different antenna elements (not shown) at adder 866.

Each of the antenna/circuit blocks illustrated in FIGS. 8a-8f is configured to code an incident signal received at the antenna with a code to form or otherwise generate a coded signal. Accordingly, each of these antenna/circuit blocks comprise a means for coding an incident signal with an orthogonal code or PN sequence to form a coded signal. Although the codes depicted in FIGS. 8a-8F are shown as PN blocks, it will be understood that orthogonal codes such as Walsh codes may be substituted for the PN sequences in these embodiments.

Each of the antenna/circuit blocks illustrated in FIGS. 8a-8f can also be implemented in an antenna array in a manner similar to that shown above for FIG. 7. For example, FIGS. 9 and 10 respectively show systems including antenna arrays implementing the antenna/circuit blocks corresponding to phase reconfigurable antenna 800 of FIG. 8a and antenna/circuit block 820 of FIG. 8c.

Figure 9:
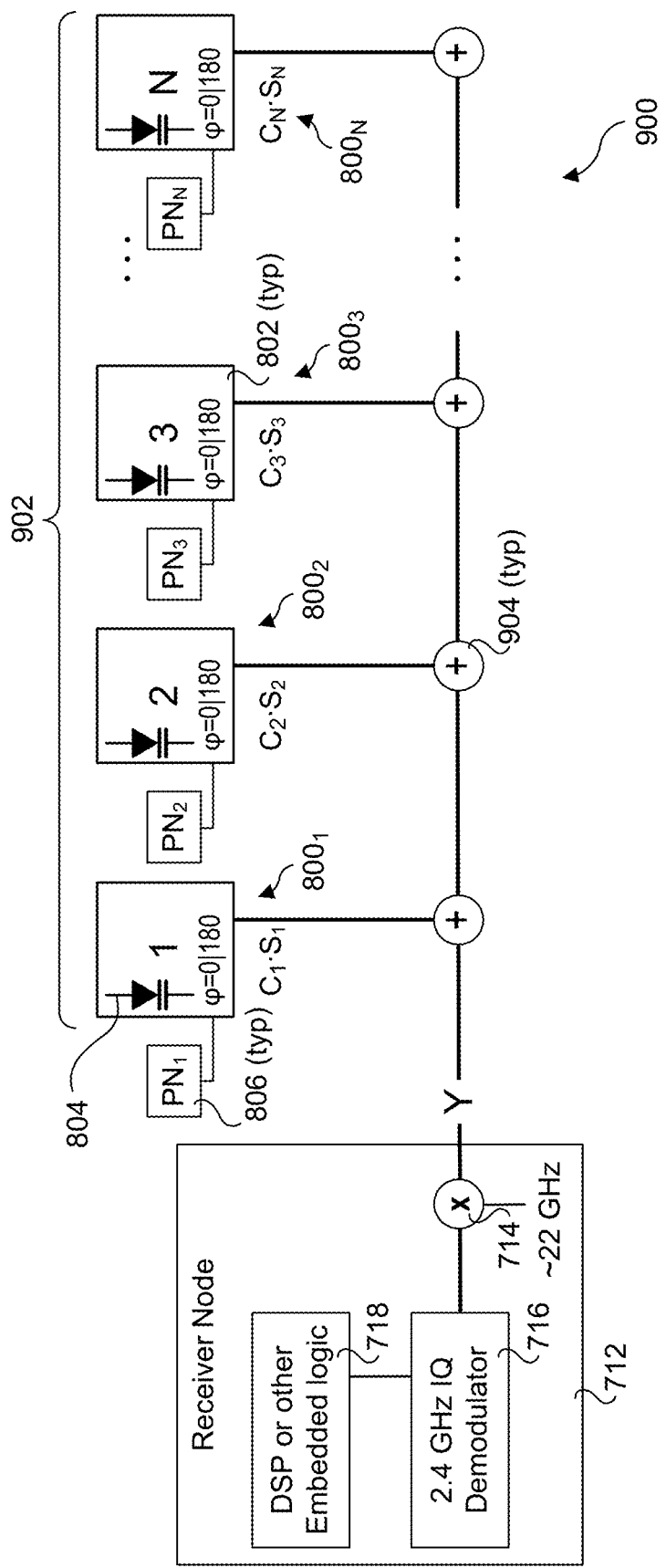
FIG. 9 is a block diagram for an exemplary 24 GHz system implementation using an array of the phase-reconfigurable antennas of FIG. 8a, according to one embodiment.

In further detail, FIG. 9 shows a system 900 including an antenna/circuit block array 902 having N phase-reconfigurable antennas $800_1, 800_2, 800_3, \ldots 800_N$. Incident signals are received by each antenna 1, 2, 3, .... N and coded using respective pseudorandom sequences sequence 806 ($PN_1, PN_2, PN_3, PN_N$). This produces respective coded signals $C_1 \cdot S_1, C_2 \cdot S_2, C_3 \cdot S_3, \ldots C_4 \cdot S_N$, which are added using adders 904 to form a combined waveform Y. Combined coded waveform Y is then processed by receiver node 712 in a similar manner described above for FIG. 7.

Figure 10:
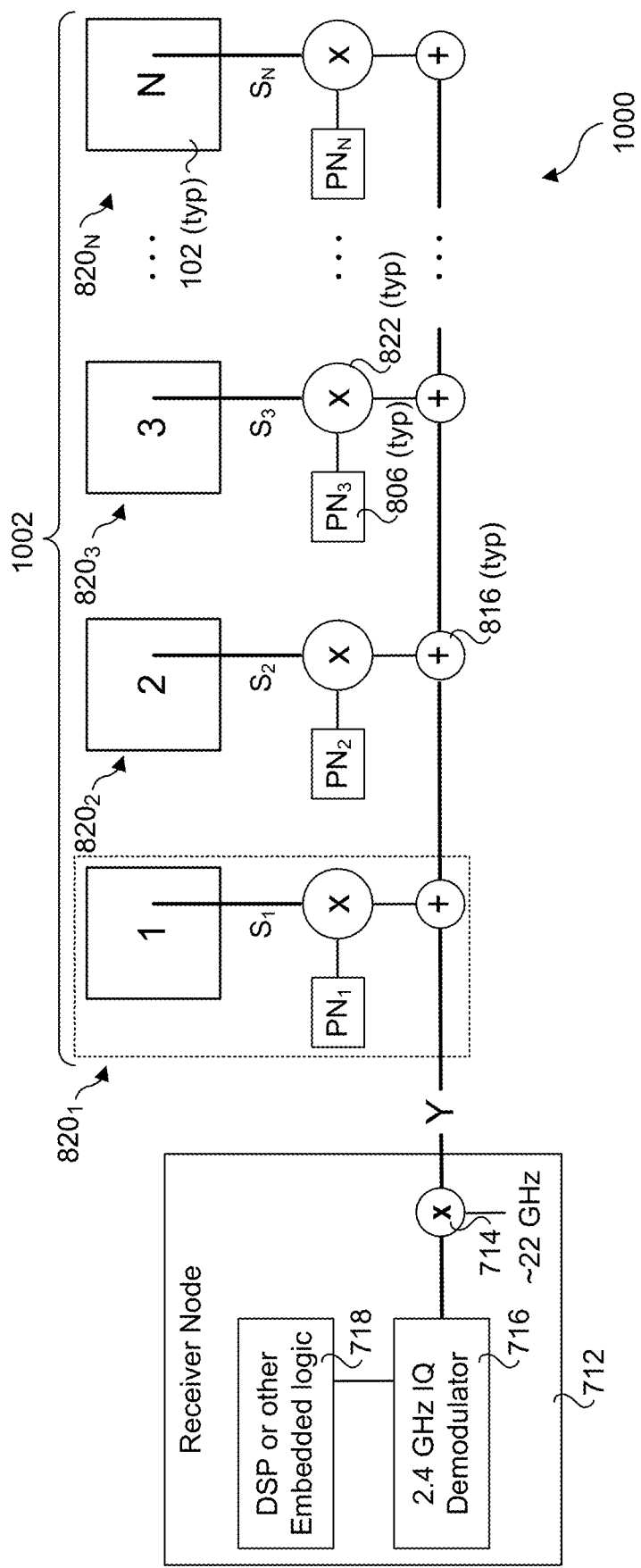
FIG. 10 is a block diagram for an exemplary 24 GHz system implementation using an array of the antenna/block circuits of FIG. 8c, according to one embodiment.

FIG. 10 shows a system 1000 including an antenna/circuit block array 1002 having N antenna/circuit block $820_1, 820_2, 820_3, \ldots 820_N$, each comprising a mixer or image-reject mixer and configured in a similar manner to antenna/circuit block 820 of FIG. 8c. Incident signals are received by each antenna 1, 2, 3, .... N and coded using respective pseudorandom sequences sequence 806 ($PN_1, PN_2, PN_3, PN_N$) using mixers 822. The coded signals output from mixers 822 are added using adders 816 to form a combined coded waveform Y. Combined coded waveform Y is then processed by receiver node 712 in a similar manner described above for FIG. 7.

Figure 11:
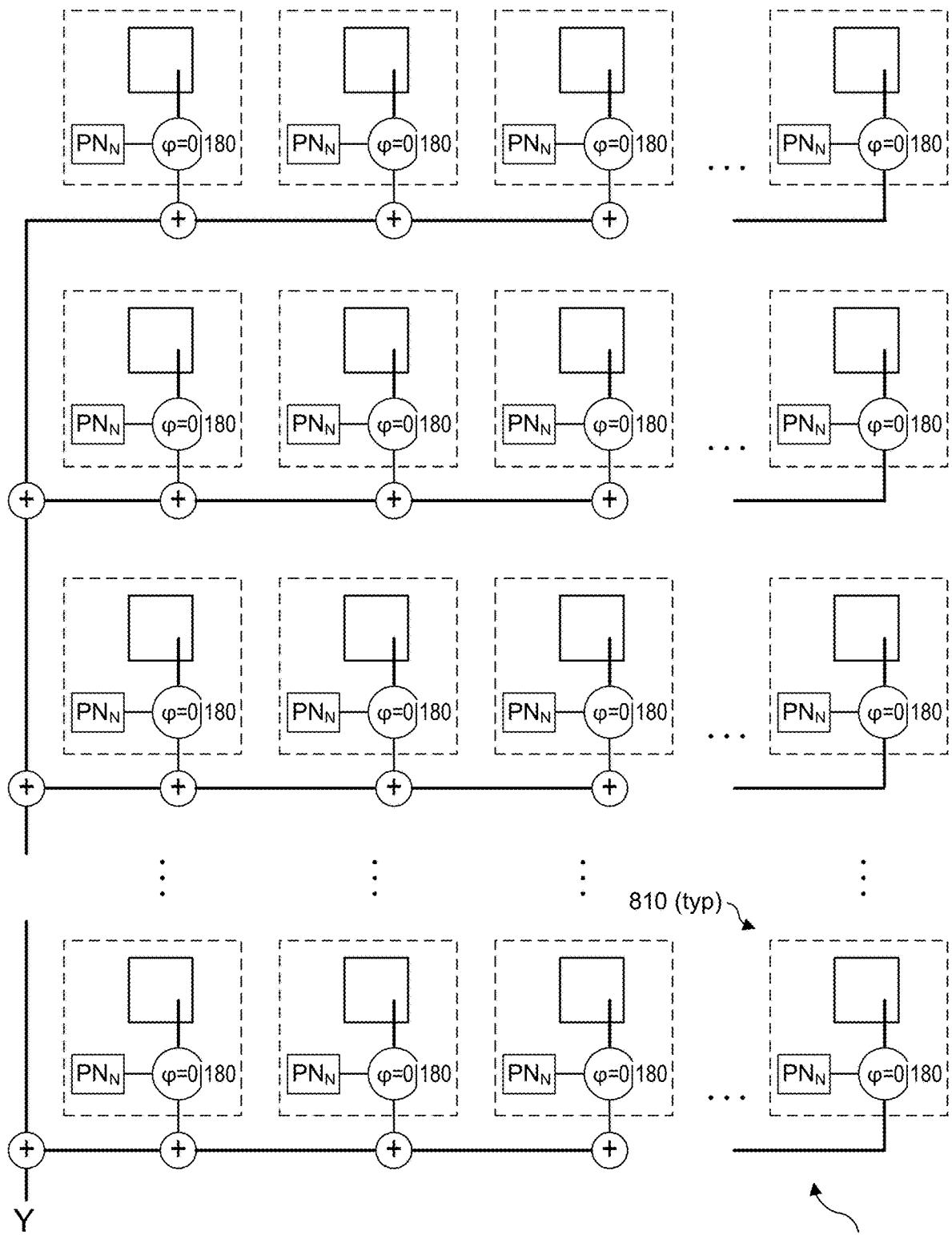
FIG. 11 is a diagram illustrating an array of antenna/circuit blocks wherein the circuitry used to code incident signals received at the antennas is collocated with the antennas.
Figure 12:
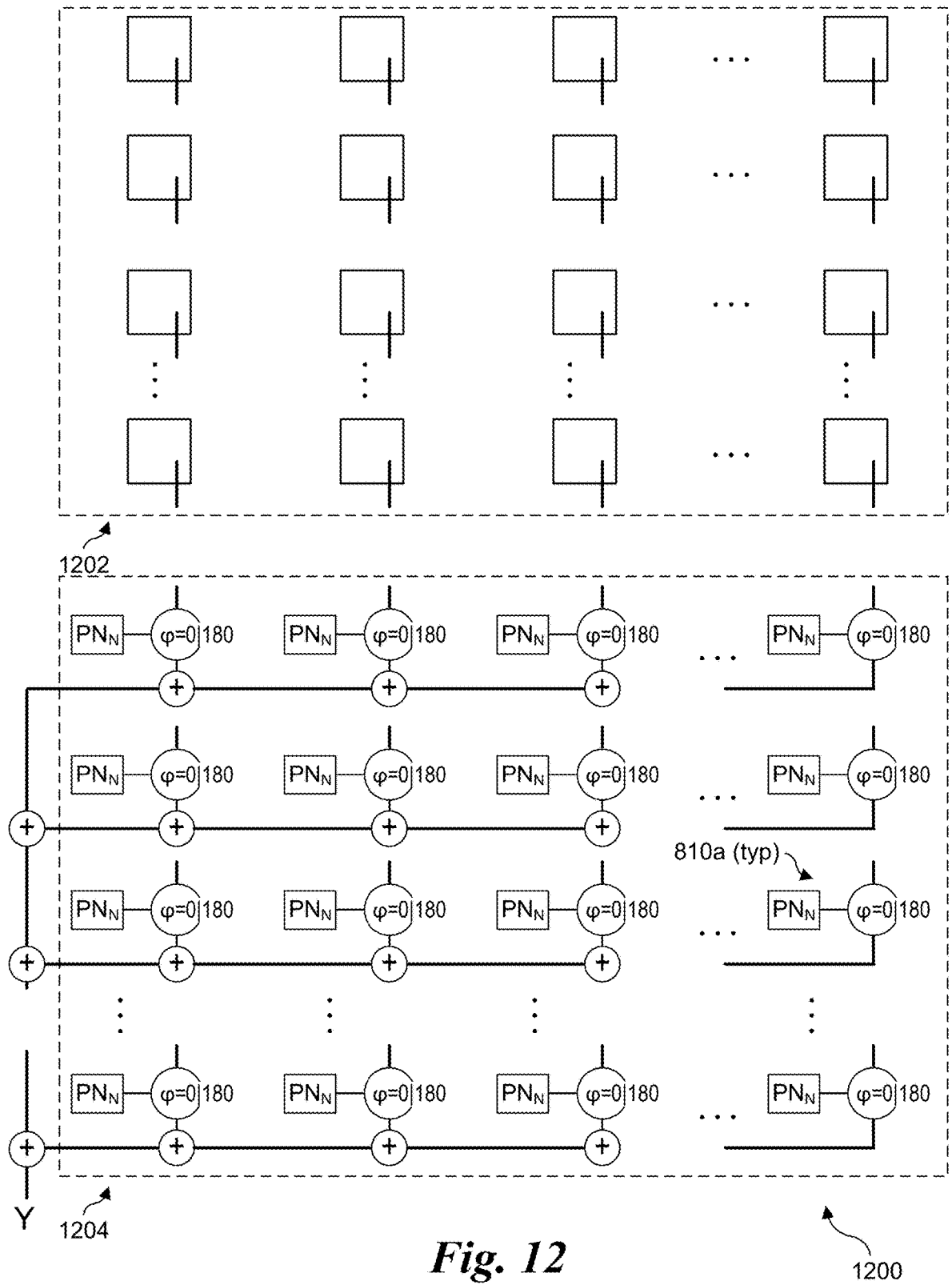
FIG. 12 is a diagram illustrating an embodiment under which the antenna array and the circuitry used to code incident signals received at the antennas is separate from the antennas.

Generally, the circuitry described an illustrated herein for an antenna/circuit block may be collocated at an antenna, or may be separate from the antenna. Embodiments of exemplary architectures 1100 and 1200 illustrating these two options are shown in FIGS. 11 and 12.

Architecture 1100 includes a two-dimensional array of antenna/circuit blocks 810, each having a configuration similar to that shown in FIG. 8b. This is merely illustrative of one option, as each of the other antenna/circuit blocks illustrated in FIGS. 8a and 8c-8f may be implemented in a similar manner. In some embodiments, the antennas in the array will have a fixed pitch (i.e., spacing), while in other embodiments the antennas may be arranged using different spacing or in a manner under which some rows or columns are staggered relative to adjacent rows or columns.

Architecture 1200 separates out the antennas and the circuitry used to code the incident signals received at the antennas, as depicted by an antenna array 1202 and a circuit block array 1204. In the illustrated example, the circuit block array 1204 comprise an array of circuit blocks 810a, where each circuit block 810a includes circuitry similar to that shown in antenna/circuit block 810 of FIG. 8b. Circuit blocks including circuitry similar to that shown for the antenna/circuit blocks in FIGS. 8c-8f may be implemented in a similar manner.

Implementation of Coded Antenna Array in a Wireless Power Transmission System

Embodiments of the invention disclosed herein may be implemented in various types of wireless system. In some embodiments, this includes implementation in wireless power transmission systems (WPTS). Generally, the techniques described and illustrated above, may be used to extract and/or calculate the phases and magnitudes of signals received at different antennas in the antenna array from individual clients. As explained below, the phase and magnitude information can then be used to direct power transmission signals towards the individual clients.

Figure 13:
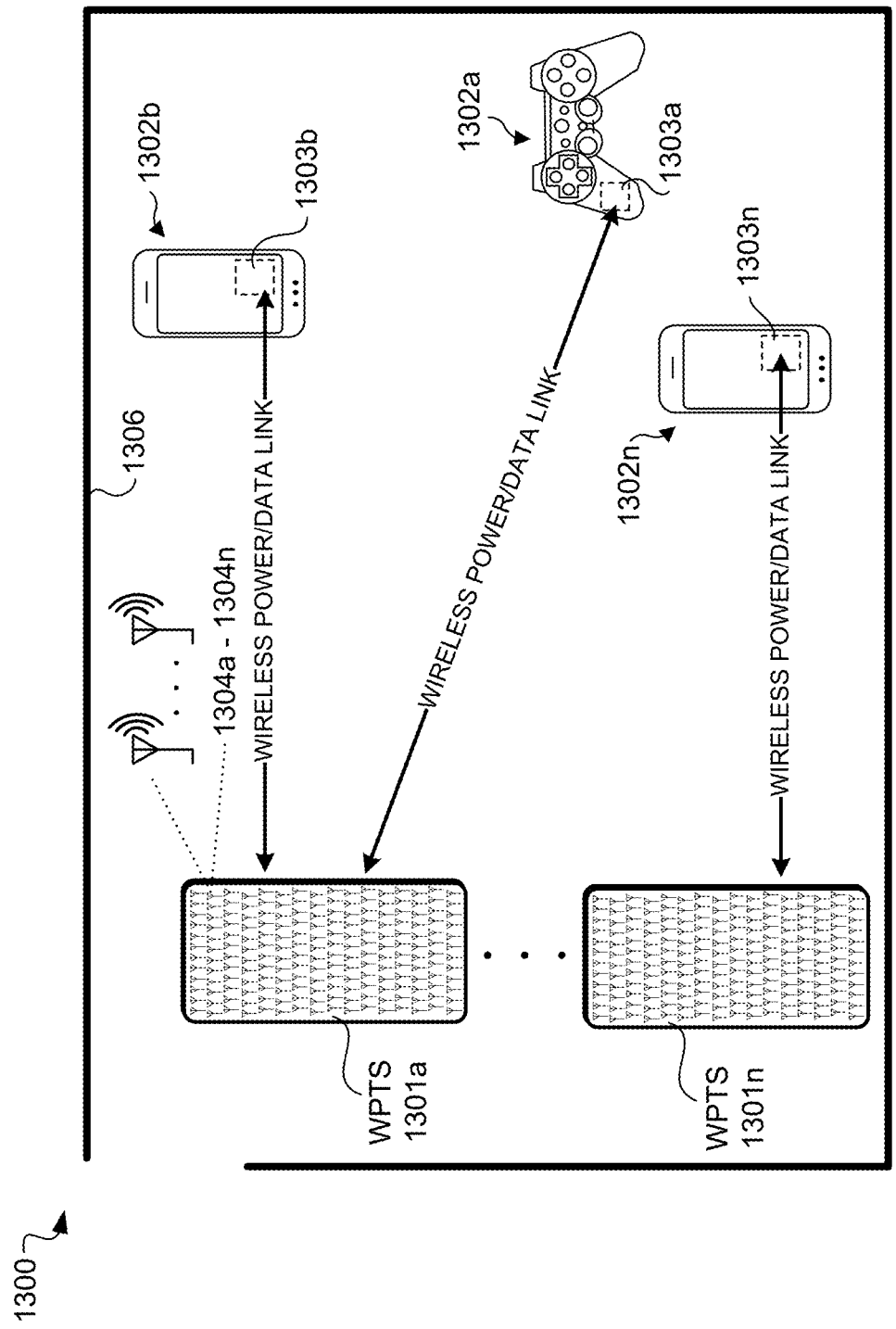
FIG. 13 depicts an example wireless power delivery environment illustrating wireless power delivery from one or more wireless power transmission systems to various wireless devices within the wireless power delivery environment in accordance with some embodiments.

To have a better understanding of how this may be implemented, an overview of the operation of a WPTS is now presented. FIG. 13 depicts a block diagram including an example wireless power delivery environment 1300 illustrating wireless power delivery from one or more WPTS 1301a-n (also referred to as "wireless power delivery systems", "antenna array systems" and "wireless chargers") to various wireless devices 1302a-n within the wireless power delivery environment 1300, according to some embodiments. More specifically, FIG. 13 illustrates an example wireless power delivery environment 1300 in which wireless power and/or data can be delivered to available wireless devices 1302a-1302n having one or more wireless power receiver clients 1303a-1303n (also referred to herein as "clients" and "wireless power receivers"). The wireless power receiver clients are configured to receive and process wireless power from one or more wireless power transmission systems 1301a-1301n. Components of an example wireless power receiver client 1303 are shown and discussed in greater detail with reference to FIG. 16.

As shown in the example of FIG. 13, the wireless devices 1302a-1302n include mobile phone devices and a wireless game controller. However, the wireless devices 1302a-1302n can be any device or system that needs power and is capable of receiving wireless power via one or more integrated power receiver clients 1303a-1303n. As discussed herein, the one or more integrated power receiver clients receive and process power from one or more wireless power transmission systems 1301a-1301n and provide the power to the wireless devices 1302a-1302n (or internal batteries of the wireless devices) for operation thereof.

Each wireless power transmission system 1301 can include multiple antennas 1304a-n, e.g., an antenna array including hundreds or thousands of antennas, which are capable of delivering wireless power to wireless devices 1302. In some embodiments, the antennas are adaptively-phased radio frequency (RF) antennas. Using the techniques described above for determining the phases of signals received from individual clients at each antenna, the wireless power transmission system 1301 is capable of determining the appropriate phases with which to deliver a coherent power transmission signal to the power receiver clients 1303. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems. In some embodiments, the wireless power transmission system 1301 can have an embedded Wi-Fi hub for data communications via one or more antennas or transceivers.

The wireless devices 1302 can include one or more receive power clients 1303. As illustrated in the example of FIG. 13, power delivery antennas 1304a-1304n are shown. The power delivery antennas 1304a are configured to provide delivery of wireless radio frequency power in the wireless power delivery environment. In some embodiments, one or more of the power delivery antennas 1304a-1304n can alternatively or additionally be configured for data communications in addition to or in lieu of wireless power delivery. The one or more data communication antennas are configured to send data communications to and receive data communications from the power receiver clients 1303a-1303n and/or the wireless devices 1302a-1302n. In some embodiments, the data communication antennas can communicate via Bluetooth™, Wi-Fi™ (including but not limited to IEEE 802.11a, 802.11b, 802.11g, 802.11n, 802.11ac), ZigBee™, etc. Other data communication protocols are also possible.

Each power receiver client 1303a-1303n includes one or more antennas (not shown) for receiving signals from the wireless power transmission systems 1301a-1301n. Likewise, each wireless power transmission system 1301a-1301n includes an antenna array having one or more antennas and/or sets of antennas capable of emitting continuous wave or discrete (pulse) signals at specific phases relative to each other. As discussed above, each the wireless power transmission systems 1301a-1301n is capable of determining the appropriate phases for delivering the coherent signals to the power receiver clients 1302a-1302n. For example, in some embodiments, coherent signals can be determined by computing the complex conjugate of a received beacon (or calibration) signal at each antenna of the array such that the coherent signal is phased for delivering power to the particular power receiver client that transmitted the beacon (or calibration) signal.

Although not illustrated in the example of FIG. 13, the wireless power transmission system 1301 and the power receiver clients 1303a-1303n can each include a data communication module for communication via a data channel.

Alternatively, or additionally, the power receiver clients 1303a-1303n can direct the wireless devices 1302a-1302n to communicate with the wireless power transmission system via existing data communications modules. In some embodiments the beacon signal, which is primarily referred to herein as a continuous waveform, can alternatively or additionally take the form of a modulated signal.

FIG. 4 is a sequence diagram 1400 illustrating example operations between a wireless power delivery system (e.g., WPTS 1301) and a wireless power receiver client (e.g., wireless power receiver client 1303) for establishing wireless power delivery in a multipath wireless power delivery, according to an embodiment. Initially, communication is established between the wireless power transmission system 1301 and the power receiver client 1303. The initial communication can be, for example, a data communication link that is established via one or more antennas 1304 of the wireless power transmission system 1301. As discussed, in some embodiments, one or more of the antennas 1304a-1304n can be data antennas, wireless power transmission antennas, or dual-purpose data/power antennas. Various information can be exchanged between the wireless power transmission system 1301 and the wireless power receiver client 1303 over this data communication channel. For example, wireless power signaling can be time sliced among various clients in a wireless power delivery environment. In such cases, the wireless power transmission system 1301 can send beacon schedule information, e.g., Beacon Beat Schedule (BBS) cycle, power cycle information, etc., so that the wireless power receiver client 1303 knows when to transmit (broadcast) its beacon signals and when to listen for power, etc.

Figure 14:
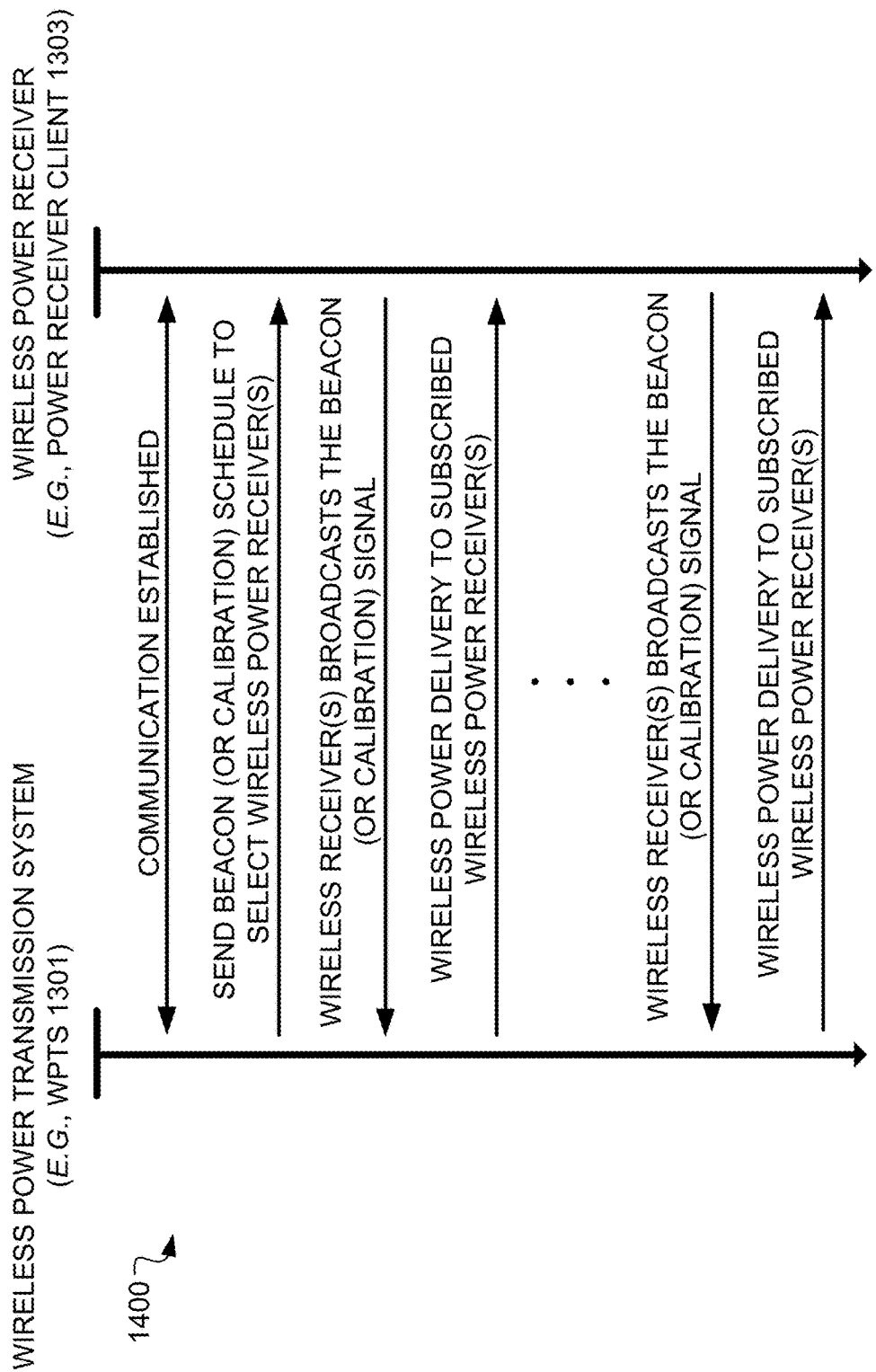
FIG. 14 depicts a sequence diagram illustrating example operations between a wireless power transmission system and a wireless receiver client for commencing wireless power delivery in accordance with some embodiments.

Continuing with the example of FIG. 14, the wireless power transmission system 1301 selects one or more wireless power receiver clients for receiving power and sends the beacon schedule information to the select power receiver clients 1303. The wireless power transmission system 1301 can also send power transmission scheduling information so that the power receiver client 1303 knows when to expect (e.g., a window of time) wireless power from the wireless power transmission system. The power receiver client 1303 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 1303 include one or more antennas (or transceivers) which have a radiation and reception pattern in three-dimensional space proximate to the wireless device 1302 in which the power receiver client 1303 is embedded.

The wireless power transmission system 1301 receives the beacon from the power receiver client 1303 and detects and/or otherwise measures the phase (or direction) from which the beacon signal is received at multiple antennas. The wireless power transmission system 1301 then delivers wireless power to the power receiver client 1303 from the multiple antennas 1303 based on the detected or measured phase (or direction) of the received beacon at each of the corresponding antennas. In some embodiments, the wireless power transmission system 1301 determines the complex conjugate of the measured phase of the beacon and uses the complex conjugate to determine a transmit phase that configures the antennas for delivering and/or otherwise directing wireless power to the power receiver client 1303 via the same path over which the beacon signal was received from the power receiver client 1303.

In some embodiments, the wireless power transmission system 1301 includes many antennas; one or more of which are used to deliver power to the power receiver client 1303. Using the coded antenna array schemes described herein, the wireless power transmission system 1301 can detect and/or otherwise determine or measure phases at which the beacon signals are received at each antenna. The large number of antennas may result in different phases of the beacon signal being received at each antenna of the wireless power transmission system 1301. As discussed above, the wireless power transmission system 1301 can determine the complex conjugate of the beacon signals received at each antenna. Using the complex conjugates, one or more antennas may emit a signal that takes into account the effects of the large number of antennas in the wireless power transmission system 1301. In other words, the wireless power transmission system 1301 can emit a wireless power transmission signal from the one or more antennas in such a way as to create an aggregate signal from the one or more of the antennas that approximately recreates the waveform of the beacon in the opposite direction. Said another way, the wireless power transmission system 1301 can deliver wireless RF power to the client device via the same paths over which the beacon signal is received at the wireless power transmission system 1301. These paths can utilize reflective objects 1306 within the environment. Additionally, the wireless power transmission signals can be simultaneously transmitted from the wireless power transmission system 1301 such that the wireless power transmission signals collectively match the antenna radiation and reception pattern of the client device in a three-dimensional (3D) space proximate to the client device.

As shown, the beacon (or calibration) signals can be periodically transmitted by power receiver clients 1303 within the power delivery environment according to, for example, the BBS, so that the wireless power transmission system 1301 can maintain knowledge and/or otherwise track the location of the power receiver clients 1303 in the wireless power delivery environment. The process of receiving beacon signals from a wireless power receiver client at the wireless power transmission system and, in turn, responding with wireless power directed to that particular client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 15.

Figure 15:
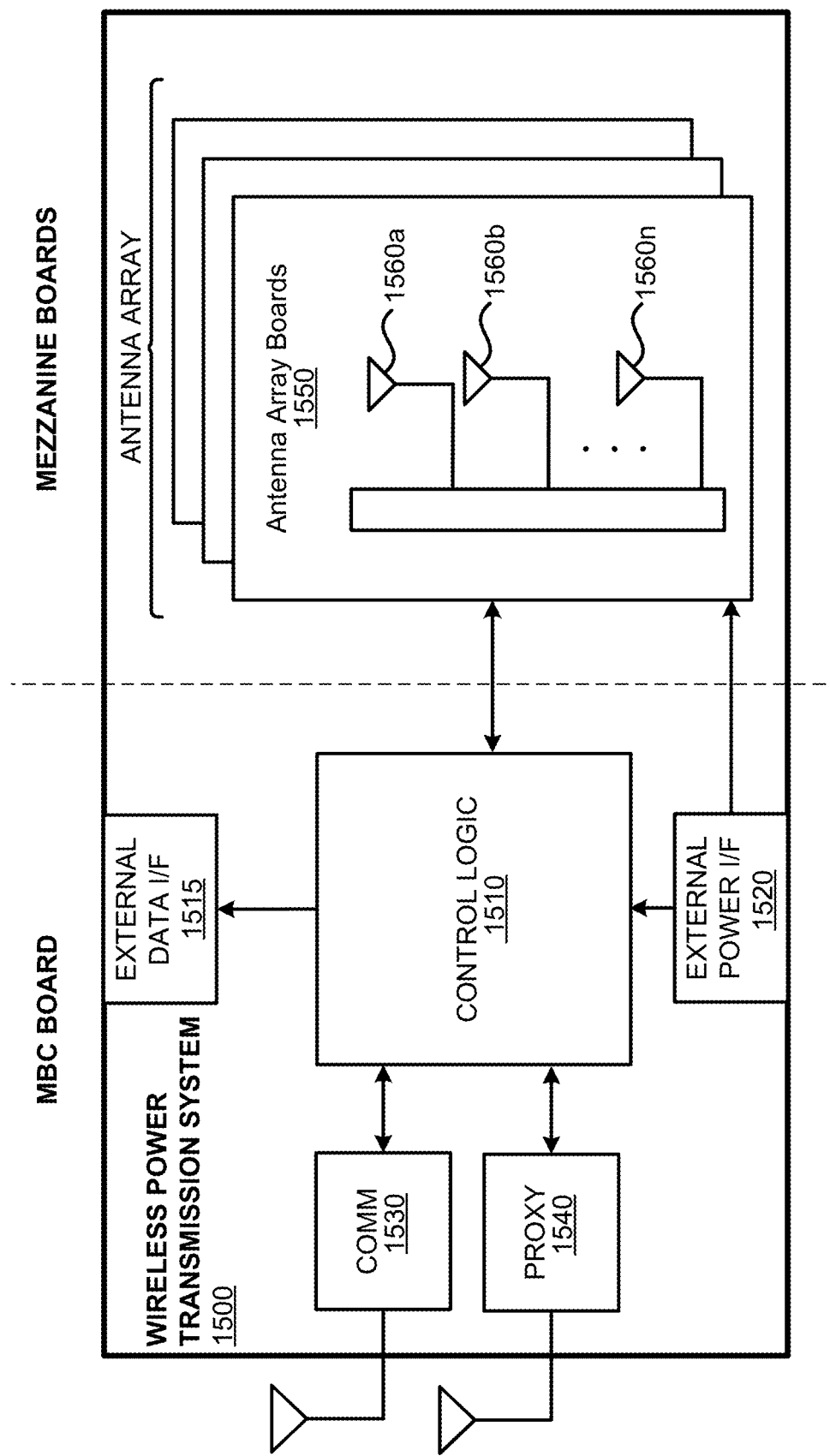
FIG. 15 depicts a block diagram illustrating example components of a wireless power transmission system in accordance with some embodiments.

FIG. 15 is a block diagram illustrating example components of a wireless power transmission system 1500, in accordance with an embodiment. As illustrated in the example of FIG. 15, the wireless charger 1500 includes a master bus controller (MBC) board and multiple mezzanine boards that collectively comprise the antenna array. The MBC includes control logic 1510, an external data interface (I/F) 1515, an external power interface (I/F) 1520, a communication block 1530 and proxy 1540. The mezzanine (or antenna array boards 1550) each include multiple antennas 1560a-1560n. Some or all of the components can be omitted in some embodiments. Additional components are also possible. For example, in some embodiments only one of communication block 1530 or proxy 1540 may be included.

The control logic 1510 is configured to provide control and intelligence to the array components. The control logic 1510 may comprise one or more processors, FPGAs, memory units, etc., and direct and control the various data and power communications. The communication block 1530 can direct data communications on a data carrier frequency, such as the base signal clock for clock synchronization. The data communications can be Bluetooth™, Wi-Fi™, Zig-Bee™, etc., including combinations or variations thereof. Likewise, the proxy 1540 can communicate with clients via data communications as discussed herein. The data communications can be, by way of example and not limitation, Bluetooth™, Wi-Fi™, ZigBee™, etc. Other communication protocols are possible.

In some embodiments, the control logic 1510 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 1500 over a data connection. This IoT information can be provided to via an external data interface 1515 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 1520 is configured to receive external power and provide the power to various components. In some embodiments, the external power interface 1520 may be configured to receive a standard external 24 Volt power supply. In other embodiments, the external power interface 1520 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the master bus controller (MBC), which controls the wireless power transmission system 1500, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 16:
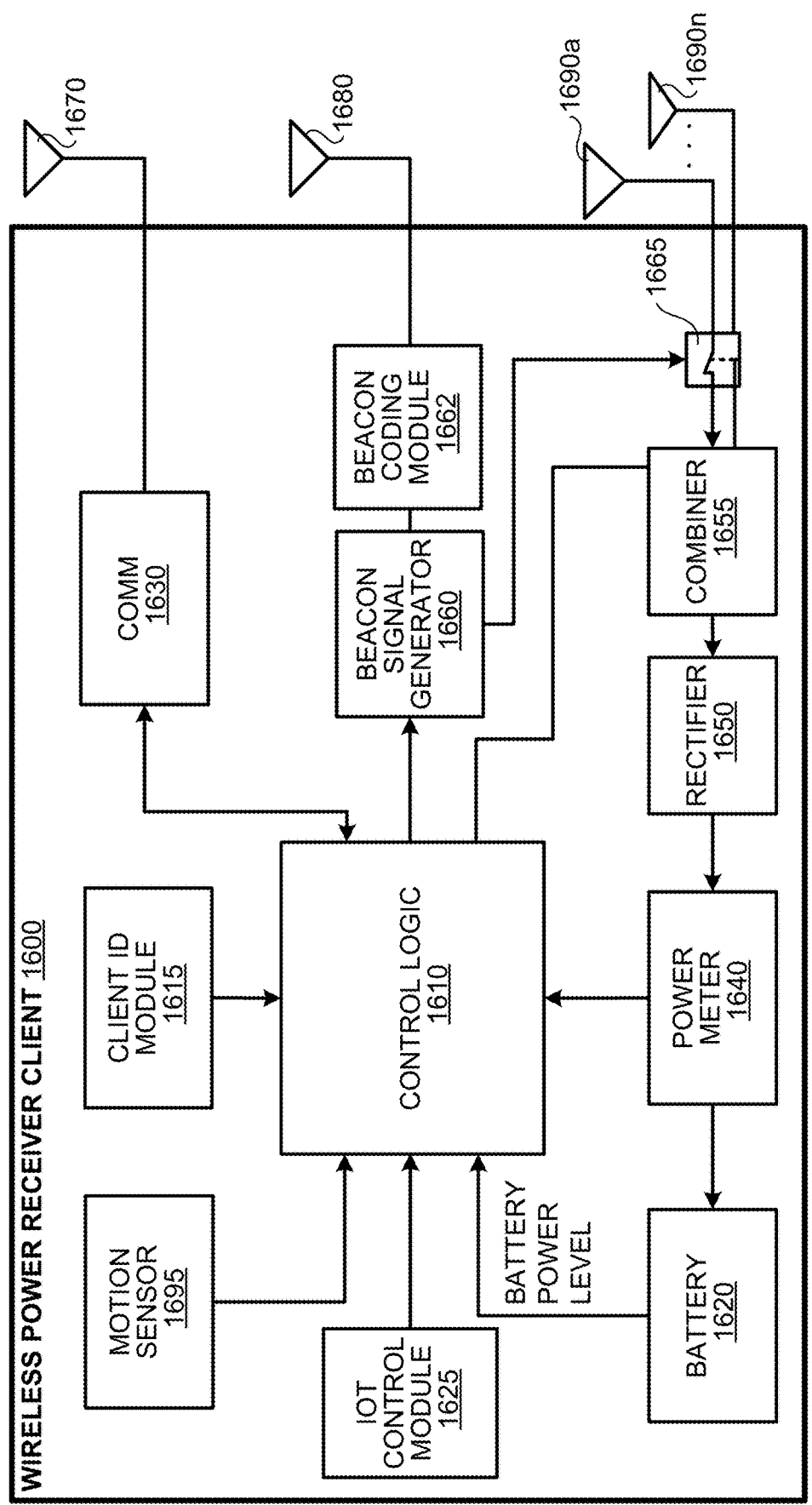
FIG. 16 depicts a block diagram illustrating example components of a wireless power receiver client in accordance with some embodiments.

FIG. 16 is a block diagram illustrating example components of a wireless power receiver client, in accordance with some embodiments. As illustrated in the example of FIG. 16, the receiver 1600 includes control logic 1610, battery 1620, an IoT control module 1625, communication block 1630 and associated antenna 1670, power meter 1640, rectifier 1650, a combiner 1655, beacon signal generator 1660, beacon coding unit 1662 and an associated antenna 1680, and switch 1665 connecting the rectifier 1650 or the beacon signal generator 1660 to one or more associated antennas 1690*a-n*. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 1655 receives and combines the received power transmission signals from the power transmitter in the event that the receiver 1600 has more than one antenna. The combiner can be any combiner or divider circuit that is configured to achieve isolation between the output ports while maintaining a matched condition. For example, the combiner 1655 can be a Wilkinson Power Divider circuit. The rectifier 1650 receives the combined power transmission signal from the combiner 1655, if present, which is fed through the power meter 1640 to the battery 1620 for charging. In other embodiments, each antenna's power path can have its own rectifier 1650 and the DC power out of the rectifiers is combined prior to feeding the power meter 1640. The power meter 1640 can measure the received power signal strength and provides the control logic 1610 with this measurement.

In some embodiments, a client identifier (ID) module 1615 stores a client ID that can uniquely identify the power receiver client in a wireless power delivery environment. For example, the ID can be transmitted to one or more wireless power transmission systems when communication is established. In some embodiments, power receiver clients may also be able to receive and identify other power receiver clients in a wireless power delivery environment based on the client ID.

Figure 17A:
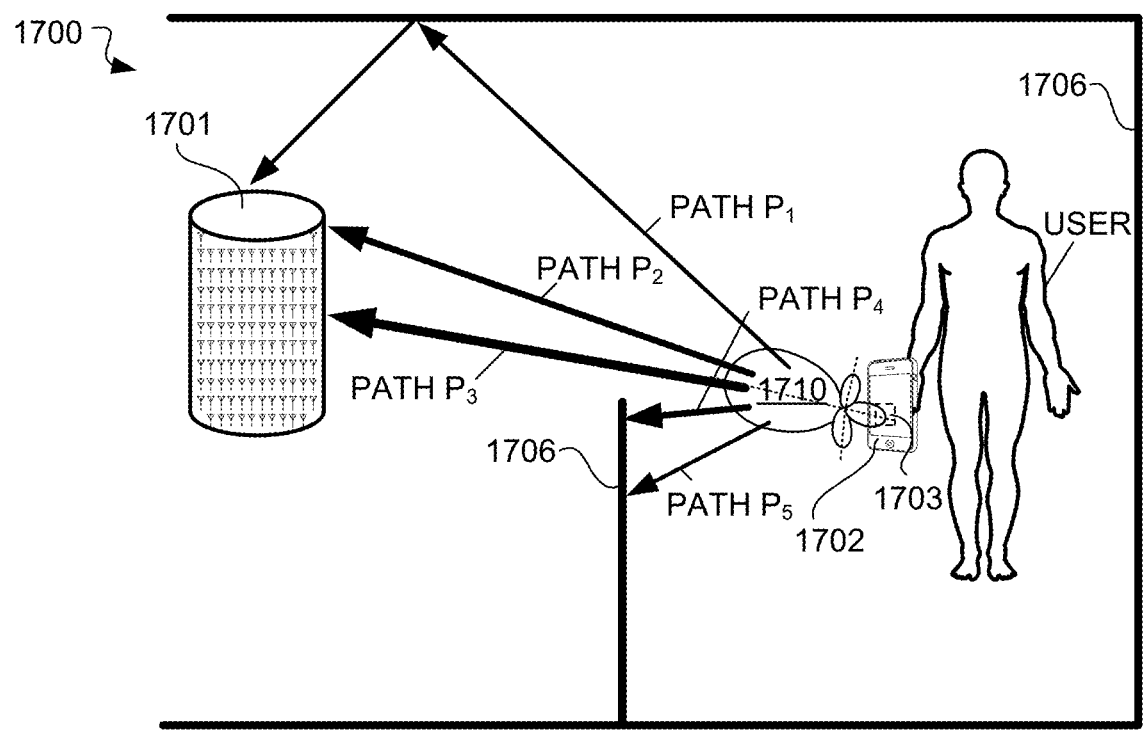
FIGS. 17a and 17b depict diagrams illustrating an example multipath wireless power delivery environment in accordance with some embodiments.
Figure 17B:
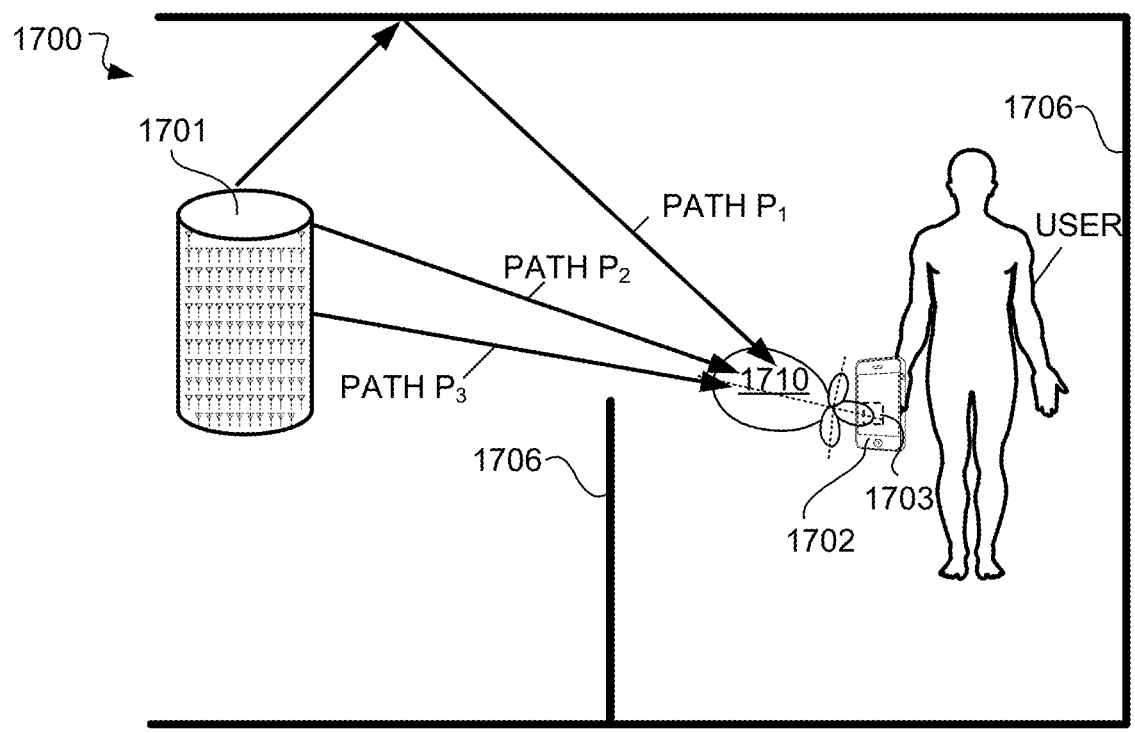

FIGS. 17*a* and 17*b* depict diagrams illustrating an example multipath wireless power delivery environment

1700, according to some embodiments. The multipath wireless power delivery environment 1700 includes a user operating a wireless device 1702 including one or more wireless power receiver clients 1703. The wireless device 1702 and the one or more wireless power receiver clients 1703 can be wireless device 1302 of FIG. 13 and wireless power receiver client 1303 of FIG. 1 or wireless power receiver client 1600 of FIG. 16, respectively, although alternative configurations are possible. Likewise, wireless power transmission system 1701 can be wireless power transmission system 1301 of FIG. 13 or wireless power transmission system 1500 of FIG. 15, although alternative configurations are possible. The multipath wireless power delivery environment 1700 includes reflective objects 1706 and various absorptive objects, e.g., users, or humans, furniture, etc.

Wireless device 1702 includes one or more antennas (or transceivers) that have a radiation and reception pattern 1710 in three-dimensional space proximate to the wireless device 1302. The one or more antennas (or transceivers) can be wholly or partially included as part of the wireless device 1702 and/or the wireless power receiver client (not shown). For example, in some embodiments one or more antennas, e.g., Wi-Fi, Bluetooth, etc. of the wireless device 1702 can be utilized and/or otherwise shared for wireless power reception. As shown in the example of FIGS. 17a and 17b, the radiation and reception pattern 1710 comprises a lobe pattern with a primary lobe and multiple side lobes. Other patterns are also possible.

The wireless device 1702 transmits a beacon (or calibration) signal over multiple paths to the wireless power transmission system 1701. As discussed herein, the wireless device 1702 transmits the beacon in the direction of the radiation and reception pattern 1710 such that the strength of the received beacon signal by the wireless power transmission system, e.g., RSSI, depends on the radiation and reception pattern 1710. For example, beacon signals are not transmitted where there are nulls in the radiation and reception pattern 1710 and beacon signals are the strongest at the peaks in the radiation and reception pattern 1710, e.g., peak of the primary lobe. As shown in the example of FIG. 17a, the wireless device 1702 transmits beacon signals over five paths $P_1$-$P_5$. Paths $P_4$ and $P_5$ are blocked by reflective and/or absorptive object 1706. The wireless power transmission system 1701 receives beacon signals of increasing strengths via paths $P_1$-$P_3$. The bolder lines indicate stronger signals. In some embodiments the beacon signals are directionally transmitted in this manner to, for example, avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetics. As shown in the example of FIGS. 17a and 17b, the radiation and reception pattern 1710 is a three-dimensional lobe shape. However, the radiation and reception pattern 1710 can be any number of shapes depending on the type or types, e.g., horn antennas, simple vertical antenna, etc. used in the antenna design. For example, the radiation and reception pattern 1710 can comprise various directive patterns. Any number of different antenna radiation and reception patterns are possible for each of multiple client devices in a wireless power delivery environment.

Referring again to FIG. 17a, the wireless power transmission system 1701 receives the beacon (or calibration) signal via multiple paths $P_1$-$P_3$ at multiple antennas or transceivers. As shown, paths $P_2$ and $P_3$ are direct line of sight paths while path $P_1$ is a non-line of sight path. Once the beacon (or calibration) signal is received by the wireless power transmission system 1701, the power transmission system 1701 processes the beacon (or calibration) signal to determine one or more receive characteristics of the beacon signal at each of the multiple antennas. For example, among other operations, a wireless power transmission system 1701 that implements a coded antenna array can measure the phases at which the beacon signal is received at each of the multiple antennas or transceivers, as described above.

The wireless power transmission system 1701 processes the one or more receive characteristics of the beacon signal at each of the multiple antennas to determine or measure one or more wireless power transmit characteristics for each of the multiple antennas based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 1701 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 17b illustrates the wireless power transmission system 1701 transmitting wireless power via paths $P_1$-$P_3$ to the wireless device 1702. Advantageously, as discussed herein, the wireless power signal matches the client radiation and reception pattern 1710 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receiver, e.g., nulls and blockages. In some embodiments, the wireless power transmission system 1701 measures the magnitude of the received beacon signal and if the beacon is less than a threshold value, the wireless power transmission system will not send wireless power over that path.

The three paths shown in the example of FIGS. 17a and 17b are illustrated for simplicity, it is appreciated that any number of paths can be utilized for transmitting power to the wireless device 1702 depending on, among other factors, reflective and absorptive objects in the wireless power delivery environment.

In retrodirective wireless power delivery environments, wireless power receivers generate and send beacon signals that are received by an array of antennas of a wireless power transmission system. The beacon indicates the directionality of the incoming signal, and also indicate directionality of the incoming signal. As discussed herein, this directionality information is employed when transmitting in order to focus energy (e.g., power wave delivery) on individual wireless power receiver clients. Additionally, directionality facilitates other applications such as, for example, tracking device movement.

In some embodiments, wireless power receiver clients in a wireless power delivery environment are tracked by a wireless power transmission system using a three dimensional angle of incidence of an RF signal (at any polarity) paired with a distance determined by using an RF signal strength or any other method. As discussed herein, the coded antenna scheme may be used to detect a wavefront angle of incidence for a beacon signal at multiple antennas in the antenna array. A distance to the wireless power receiver client can be determined based on the angle from multiple array segments. Alternatively, or additionally, the distance to the wireless power receiver client can be determined based on power calculations, such as in equation 7 above.

Aspects of the coded antenna array embodiments described herein may be implemented in a WPTS. In some embodiments, the same antennas used for power transmission are used by a coded antenna array. Alternatively, separate arrays of antennas may be used for receiving beacons or other signals from clients and transmitting power signals to the clients. For example, in one embodiment respective pairs of co-located transmit and receive antennas are arrayed in the antenna array. Since the transmit and receive antennas are co-located (meaning in very close proximity), the incident phase and magnitude data for the receiving antenna in the pair may be used for transmitting power signals using the transmit antenna in the pair.

Figure 18:
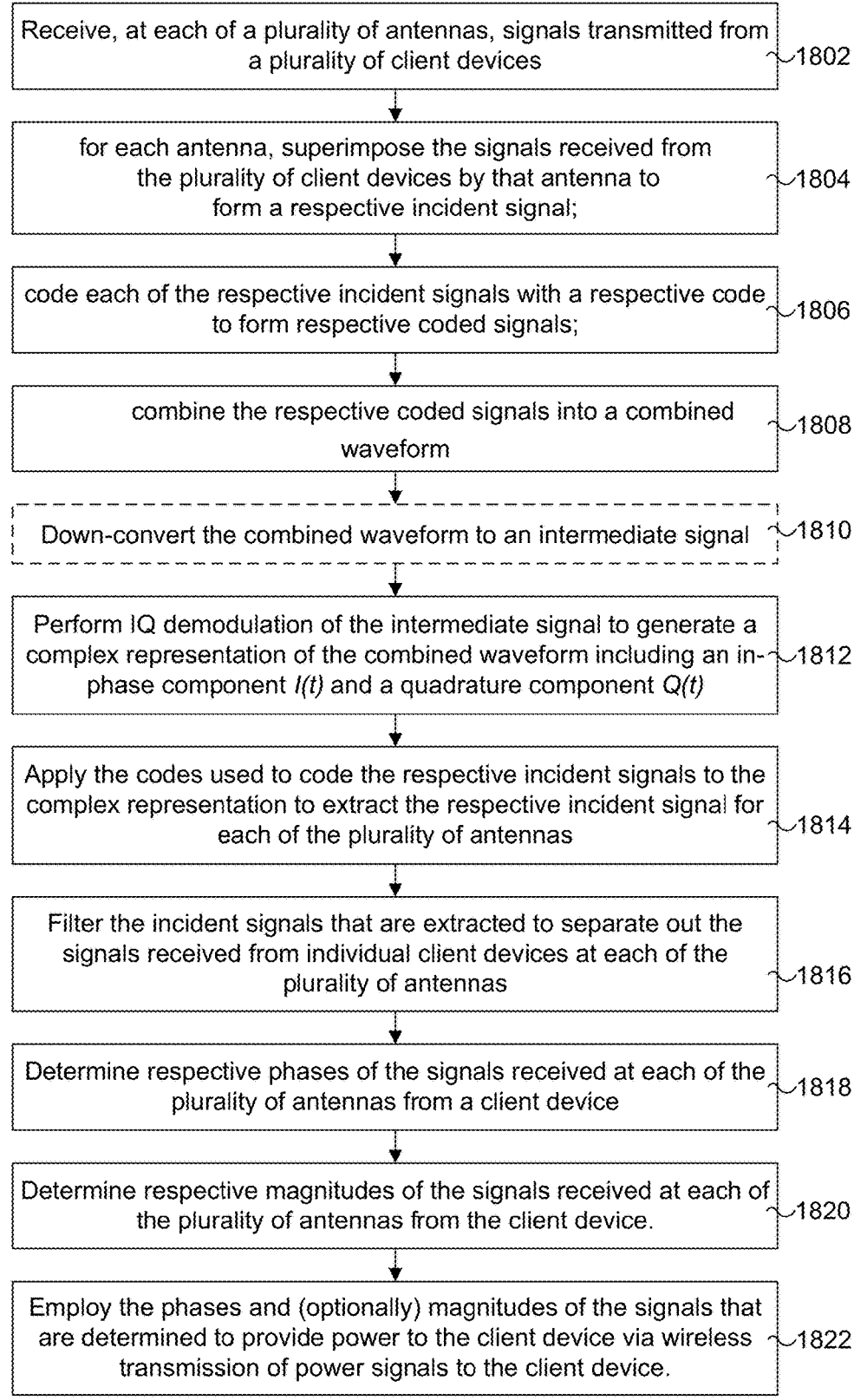
FIG. 18 is a flowchart 1800 illustrating operations performed by a WPTS using a coded antenna array, according to one embodiment.

FIG. 18 shows a flowchart 1800 illustrating operations performed by a WPTS using a coded antenna array, according to one embodiment. The operations in blocks 1802-1820 are similar to that described above in connection with the coded antenna array of FIG. 2. This begins in a block 1802, where signals transmitted from a plurality of client devices are received at each of multiple antennas in the array, similar to what is shown in FIG. 2. In a block 1804, the signals (radio waveforms) received at each antenna are superimposed to form a respected incident signal. In a block 1806, the respective incident signals are coded using respective code to form respective coded signals. The coded signals are then combined in a block 1808 to into a combined waveform Y.

In an optional block 1810, the combined waveform is down-converted to an intermediate signal. In some embodiments in which transmission signals on the transmit side are not up-converted from their baseband signals, the operation of block 1810 may not be used.

In a block 1812, the IQ demodulation is performed on the intermediate signal form of the combined waveform to generate a complex representation of the combined waveform including an in-phase component I(t) and a quadrature component Q(t). In cases where optional block 1810 is not used, the IQ demodulation is performed on the combined waveform without down-conversion.

In a block 1814, the codes used to code the respective incident signals are applied to the complex representation of the combined waveform to extract the respective incident signals received at each of the antennas. The extracted incident signals are than filtered in a block 1816 to separate out the signals received from individual WPTS client devices at each of the antennas. The filters are configured to support the beaconing scheme employed by the WPTS, enabling the signals received from individual clients to be filtered.

In a block 1818, the phases of the signals received at the antennas from a given client device are calculated or otherwise determined. In one embodiment, embedded logic is used to calculate the phase angles using equation 8 above. Similarly, in a block 1820, the magnitudes of the signals received at the antennas from a given client device are calculated or otherwise determined. In one embodiment, embedded logic is used to calculate the phase angles using equation 7 above.

At this point the phase and magnitudes of the incident signals received by the antennas in the antenna array for individual clients have been determined. In some embodiments, the signal phase data is used to provide power to a client device by directing the WPTS power transmission signals to individual clients using phases of the incident signals received at the antennas in the manner described above. In other embodiments, both the phase and signal magnitude data is used to provide power to the client device by directing the WPTS power transmission signals to individual clients using the phases and magnitudes of the incident signals received at the antennas.

In general the principles and teachings of the code antenna array apparatus and system described herein may be used in various types of systems in addition to a WPTS. As described above, sharing the receiver circuitry results in both cost reduction and simplification of simplifying timing synchronization.

In the foregoing examples, a single receiver node is used to process signals received by an antenna array. However, this is merely exemplary, and not to be limiting. For larger antenna arrays it may be advantageous to process the signals received by the antennas using multiple receiver nodes on a group-wise basis. For example, suppose the antenna array includes 1024 antennas or antenna elements. Rather than use a single receiver node for all 1024 antennas, processing of singles received from groups of the antennas could be performed using a separate receiver node for each group. For instance, 4 receiver nodes could be used for groups of 256 antennas, 8 receiver nodes could be used for groups of 128 antennas, 16 receiver nodes could be used for groups of 64 antennas, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

Firmware and/or software is typically stored in the non-volatile memory and/or the drive unit and loaded into volatile memory (e.g., RAM) prior to execution. Indeed, for large programs, it may not be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In general, the circuitry, logic and components depicted in the figures herein may also be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to ASICs, FPGAs, IP block libraries, or through one or more of software or firmware instructions executed on one or more processing elements including processors, processor cores, controllers, microcontrollers, microengines, etc.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   receiving, at each of a plurality of antennas, a respective incident signal transmitted from a respective client device;
   coding each of the incident signals received at the plurality of antennas with a respective code to form a plurality of coded signals;
   combining the plurality of coded signals into a combined waveform;
   performing IQ demodulation of the combined waveform to generate a complex representation of the combined waveform including an in-phase component I(t) and a quadrature component Q(t); and
   applying the codes used to code the incident signals to the complex representation of the combined waveform to extract the respective incident signal received at each of the plurality of antennas.

2. The method of claim 1, further comprising determining, via processing of the extracted incident signals, a phase of the incident signal received at each of the plurality of antennas.

3. The method of claim 2, further comprising determining, via processing of the extracted incident signals, a magnitude of the incident signal received at each of the plurality of antennas.

4. The method of claim 3, further comprising employing the phases and magnitudes of the incident signals that are determined to provide power to the respective client device via the wireless transmission of power signals to the respective client device.

5. The method of claim 2, further comprising employing the phases of the incident signals that are determined to provide power to the respective client device via wireless transmission of power signals to the respective client device.

6. The method of claim 1, wherein the codes are orthogonal codes.

7. The method of claim 1, where the codes are pseudorandom number sequences.

8. The method of claim 1, further comprising:
down-converting the combined waveform to an intermediate signal; and
performing the IQ demodulation of the intermediate signal to generate the complex representation of the combined waveform.

9. A method comprising:
receiving, at each of a plurality of antennas, signals transmitted from a plurality of client devices;
for each antenna, superimposing the signals received from the plurality of client devices by that antenna to form a respective incident signal;
coding each of the respective incident signals with a respective code to form respective coded signals;
combining the respective coded signals into a combined waveform;
performing IQ demodulation of the combined waveform to generate a complex representation of the combined waveform including an in-phase component I(t) and a quadrature component Q(t);
applying the codes used to code the respective incident signals to the complex representation of the combined waveform to extract the respective incident signal for each of the plurality of antennas; and
filtering the incident signals that are extracted to separate out the signals received from individual client devices at each of the plurality of antennas.

10. The method of claim 9, further comprising determining, via processing of signals that have been separated out for a given client device, respective phases of the signals received at each of the plurality of antennas from that client device.

11. The method of claim 10, further comprising determining, via processing of signals that have been separated out for a given client device, respective magnitudes of the signals received at each of the plurality of antennas from that client device.

12. The method of claim 11, further comprising employing the phases and magnitudes of the signals that are determined to provide power to the client devices via wireless transmission of power signals to the client devices.

13. The method of claim 9, wherein the codes are orthogonal codes.

14. The method of claim 9, where the codes are pseudorandom number sequences.

15. The method of claim 9, further comprising:
down-converting the combined waveform to an intermediate signal; and
performing the IQ demodulation of the intermediate signal to generate the complex representation of the combined waveform.

16. An apparatus, comprising:
a plurality of antennas, each antenna configured to receive signals transmitted from a plurality of client devices and superimpose the received signals to form an incident signal;
means for coding each of the respective incident signals with a respective code to form respective coded signals;
means for combining the respective coded signals into a combined waveform;
means for performing IQ demodulation of the combined waveform to generate a complex representation of the combined waveform including an in-phase component I(t) and a quadrature component Q(t);
means for applying the codes used for coding the respective incident signals to the complex representation of the combined waveform to extract the respective incident signal for each of the plurality of antennas; and
means for filtering the incident signals that are extracted to separate out the signals received from individual client devices at each of the plurality of antennas.

17. The apparatus of claim 16, further comprising means for calculating, for signals that have been separated out for a given client device, respective phases of the signals received at each of the plurality of antennas from that client device.

18. The apparatus of claim 17, further comprising means for calculating, for signals that have been separated out for a given client device, respective magnitudes of the signals received at each of the plurality of antennas from that client device.

19. The apparatus of claim 18, further comprising:
a wireless power transmission system for providing power to the client devices via transmission of wireless signals,
wherein the apparatus is configured to employ the phases and magnitudes of the signals that are calculated to provide power to the client devices via wireless transmission of power signals to the client devices.

20. The apparatus of claim 16, wherein the codes are Walsh codes or pseudorandom number sequences.

21. The apparatus of claim 16, further comprising:
a down-converter, to down-convert the combined waveform to in intermediate signal; and
wherein the means for performing IQ demodulation of the combined waveform perform the IQ demodulation of the intermediate signal to generate the complex representation of the combined waveform.

* * * * *